April 19, 1966  H. FEND  3,246,673
DRIVE ARRANGEMENT WITH STEPWISE POWER TAKE-OFF, PARTICULARLY
ADAPTED FOR UTILIZATION WITH LOOMS
Filed Feb. 24, 1964  22 Sheets-Sheet 1
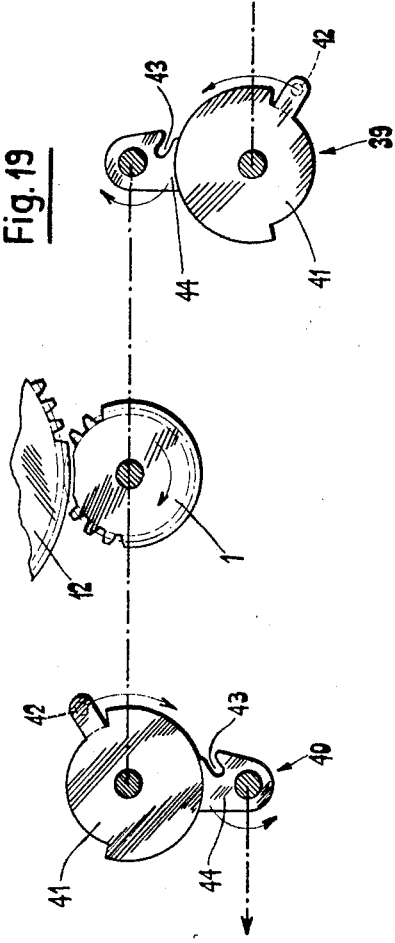
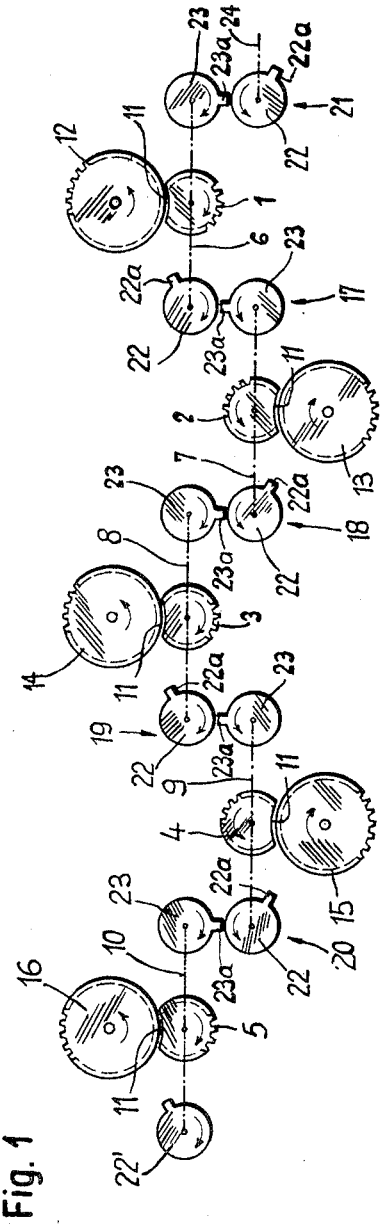
Inventor
Heinrich Fend
By
Wenderoth, Lind & Ponack
Attorneys April 19, 1966     H. FEND     3,246,673
DRIVE ARRANGEMENT WITH STEPWISE POWER TAKE-OFF, PARTICULARLY
ADAPTED FOR UTILIZATION WITH LOOMS
Filed Feb. 24, 1964     22 Sheets-Sheet 2
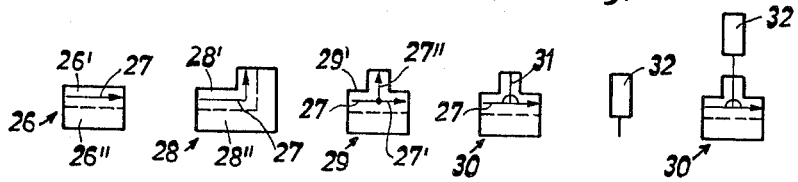
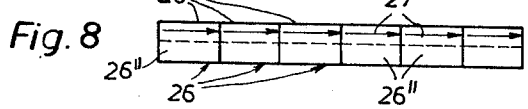
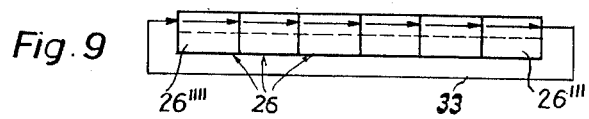
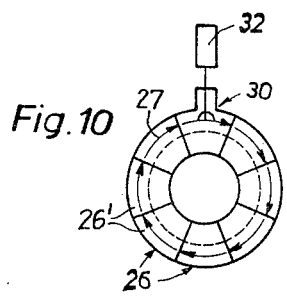
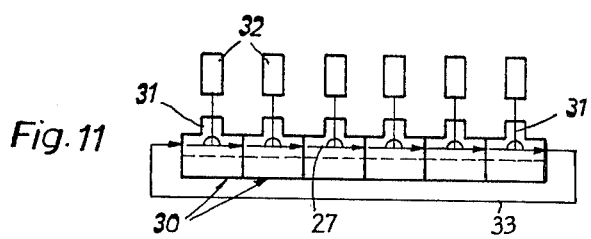
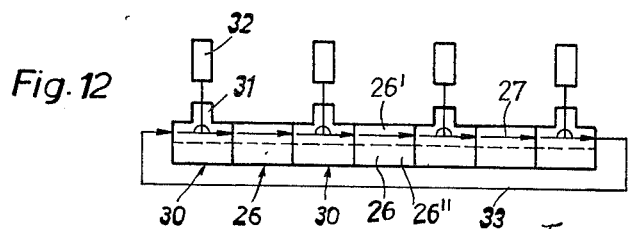
Inventor
Heinrich Fend
By
Wenderoth, Lind & Ponack
Attorneys Inventor
Heinrich Fend
By
Wenderoth, Lind & Ponack
Attorneys April 19, 1966  H. FEND  3,246,673
DRIVE ARRANGEMENT WITH STEPWISE POWER TAKE-OFF, PARTICULARLY
ADAPTED FOR UTILIZATION WITH LOOMS
Filed Feb. 24, 1964  22 Sheets-Sheet 4

Inventor
Heinrich Fend
By
Wenderoth, Lind & Ponack
Attorneys

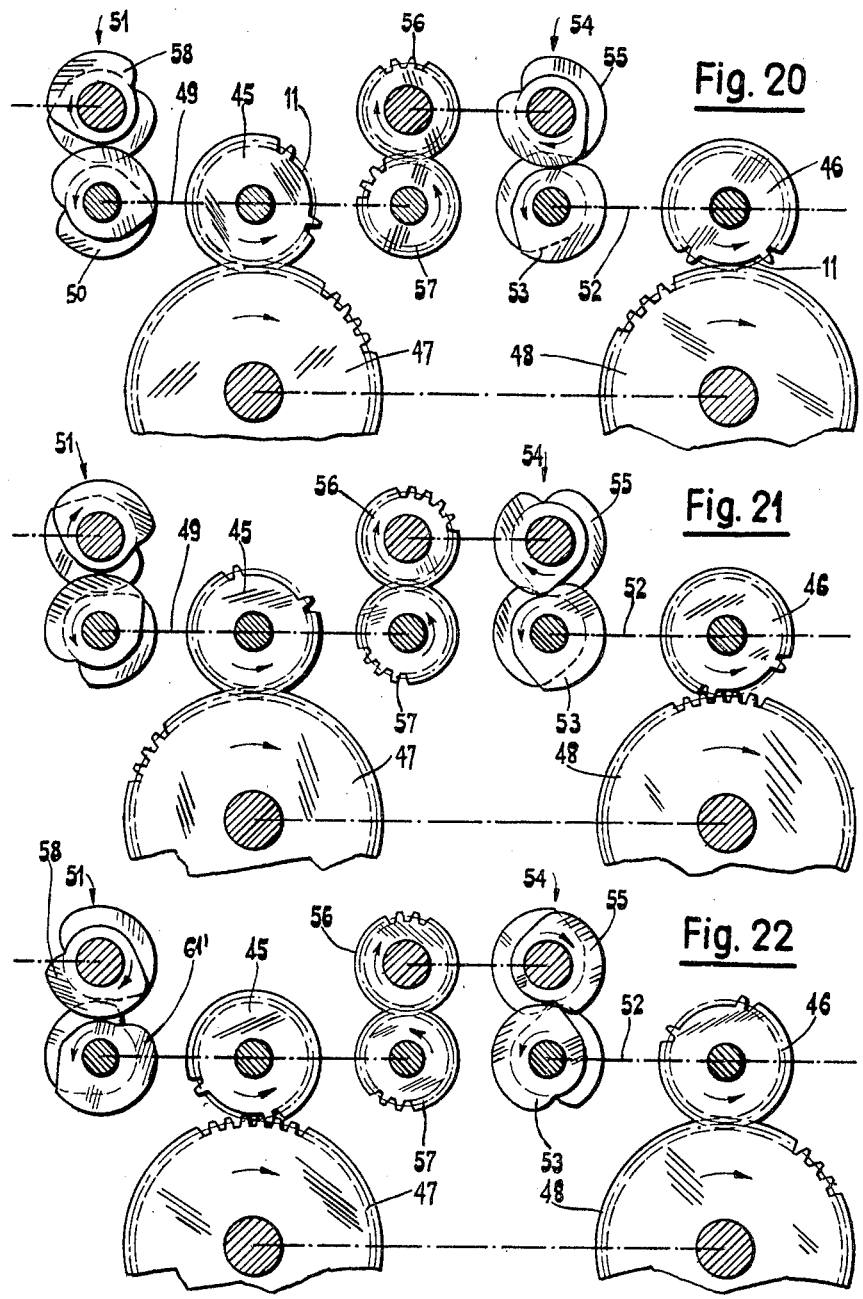

April 19, 1966 H. FEND 3,246,673
DRIVE ARRANGEMENT WITH STEPWISE POWER TAKE-OFF, PARTICULARLY
ADAPTED FOR UTILIZATION WITH LOOMS
Filed Feb. 24, 1964 22 Sheets-Sheet 6
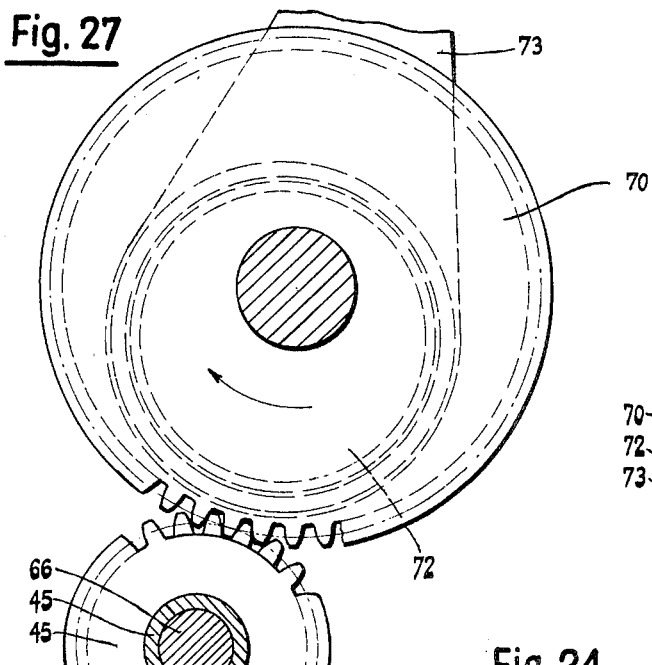
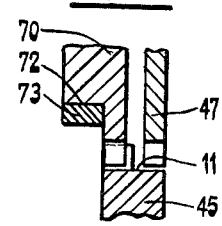
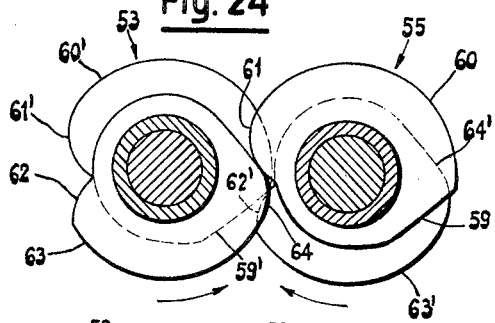
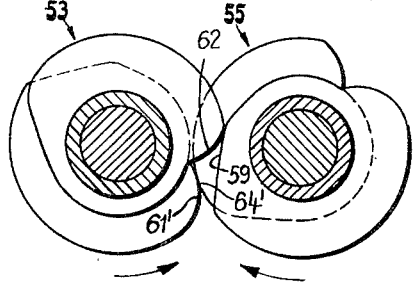
Inventor
Heinrich Fend
By
Wenderoth, Lind & Ponack
Attorneys

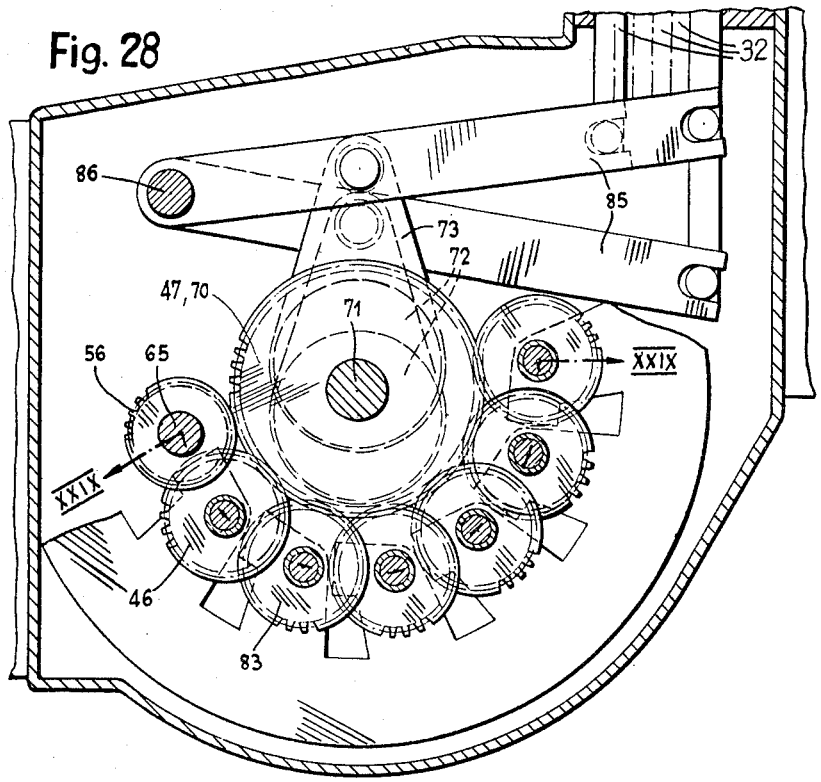

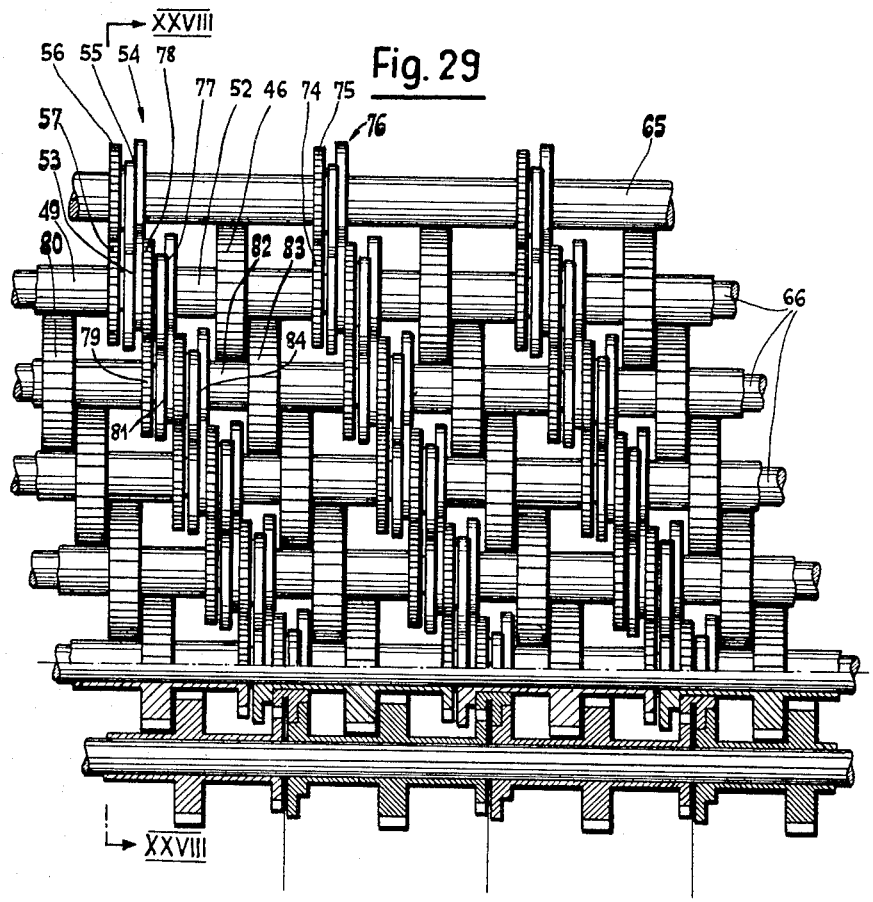

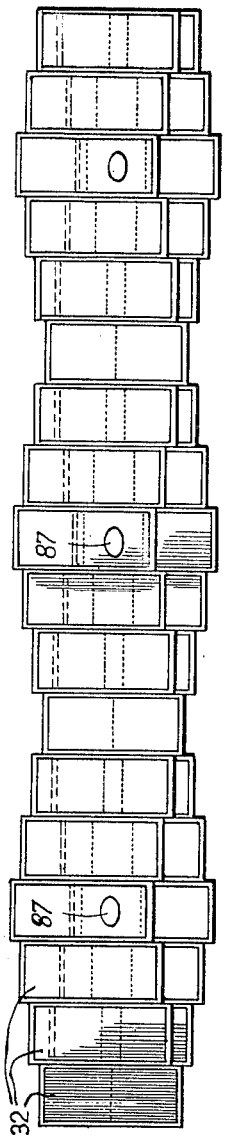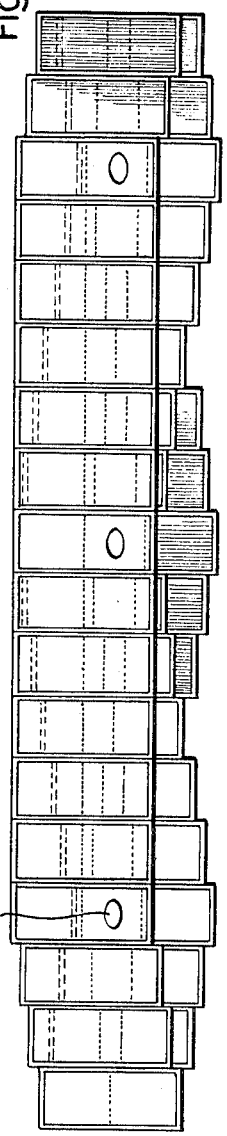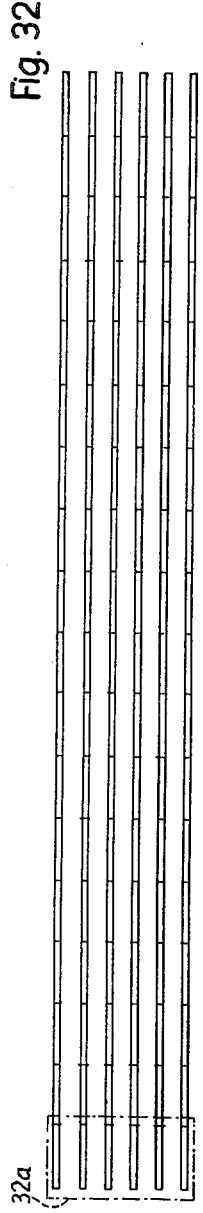

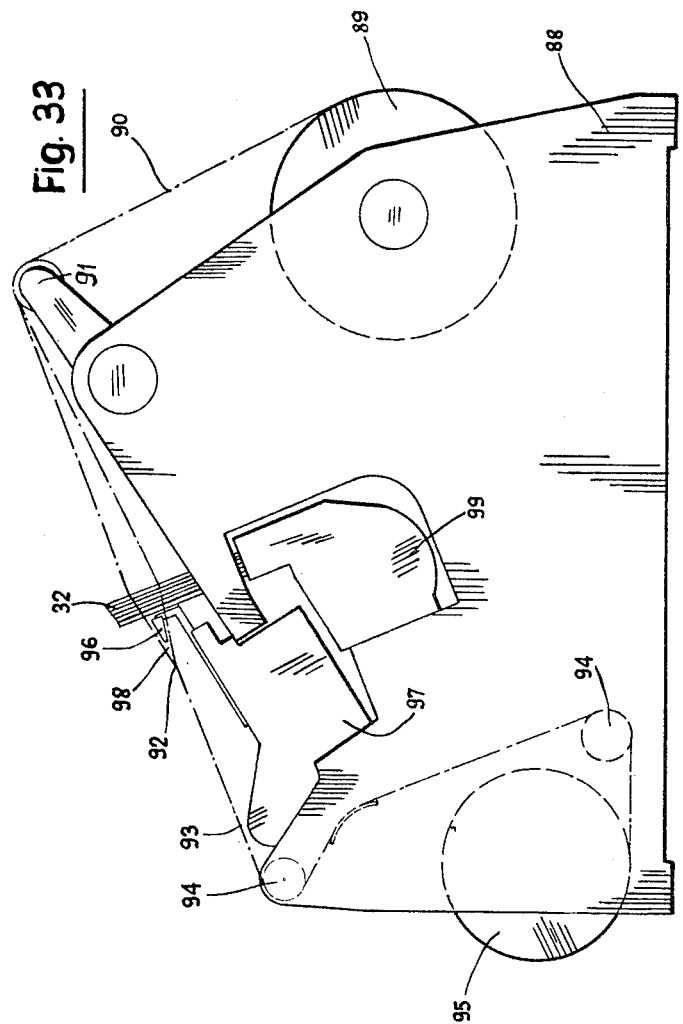

Inventor
Heinrich Fend
By
Wenderoth, Lind & Ponack
Attorneys

Inventor
Heinrich Fend
By
Wenderoth, Lind & Ponack
Attorneys

April 19, 1966 H. FEND 3,246,673
DRIVE ARRANGEMENT WITH STEPWISE POWER TAKE-OFF, PARTICULARLY
ADAPTED FOR UTILIZATION WITH LOOMS
Filed Feb. 24, 1964 22 Sheets-Sheet 18

Inventor
Heinrich Fend
By
Wenderoth, Lind & Ponack
Attorneys

Inventor
Heinrich Fend
By
Wenderoth, Lind & Ponack
Attorneys

United States Patent Office 3,246,673
Patented Apr. 19, 1966

3,246,673
DRIVE ARRANGEMENT WITH STEPWISE POWER TAKE-OFF, PARTICULARLY ADAPTED FOR UTILIZATION WITH LOOMS
Heinrich Fend, Regensdorf (Zurich), Switzerland, assignor to Verwaltungsgesellschaft der Werkzeugmaschinenfabrik Oerlikon, Zurich, Switzerland
Filed Feb. 24, 1964, Ser. No. 346,976
Claims priority, application Switzerland, Mar. 8, 1963, 2,947/63
37 Claims. (Cl. 139—1)

The present invention relates to an improved drive arrangement or mechanism of the type possessing stepwise power take-off, and which is particularly adapted, although not limited, for use in conjunction with looms.

One of the more important and characteristic features of the present invention resides in the features that, a plurality of stepwise indexing members, capable of being brought into operable engagement with a drive, are connected in series by a respective starter mechanism arranged between each two neighboring indexing members, each such starter mechanism being responsive with delay to the stepwise movement of one indexing member and being operable upon the other indexing member, whereby power can be taken-off or removed from at least one stepwise indexing member.

A preferred application of the aforementioned drive arrangement, namely the utilization of such looms, comprises a further object of the present invention. According to the invention, the application of the inventive drive arrangement for looms is characterized by the feature that the warp thread control and/or the weft thread control is operably coupled with one or a plurality of stepwise indexing members.

The invention will hereinafter be described in conjunction with the accompanying drawings in which there are depicted illustrative embodiments of the inventive drive arrangement, partially schematically depicted in conjunction with the inventive utilization of such drive arrangement with looms. As the description proceeds other features, objects and advantages of the present invention will become apparent, especially when making reference to the following detailed description and drawings in which:

FIGURE 1 schematically illustrates a first embodiment of the inventive drive mechanism or arrangement;

FIGURES 2 to 7 are functional diagrams or symbols providing a simplified mode of illustration, particularly useful for schematically illustrating different possible arrangements of the inventive drive arrangement:

FIGURES 8 to 18 schematically depict different embodiments represented in accordance with the simplified mode of illustration or "code" depicted in FIGURES 2 to 7;

FIGURE 19 schematically illustrates a variant of the drive mechanism of FIGURE 1;

FIGURES 20, 21 and 22 illustrate a modified embodiment of the drive arrangement of FIGURE 1;

FIGURES 23 and 24 depict details in somewhat enlarged view of the physical structure of the drive arrangement illustrated in FIGURES 20 to 22;

FIGURE 26 shows details of the physical structure of the drive arrangement of FIGURE 25 is enlarged view;

FIGURE 27 is a cross-sectional view of the drive arrangement of FIGURE 25, taken along lines XXVII—XXVII thereof;

FIGURE 28 illustrates, partly in cross-section, a multiple-drive arrangement provided with a plurality of drive mechanisms or arrangements corresponding to the embodiment depicted in FIGURE 25, as viewed in the direction of the section lines XXVIII—XXVIII of FIGURE 29;

FIGURE 29 is a cross-sectional view of the drive arrangement of FIGURE 28, taken along lines XXIX—XXIX thereof;

FIGURES 30, 31 and 32 illustrate the harnesses of a wave weaving loom driven by means of the drive arrangement depicted with reference to FIGURES 28 and 29;

Figure 34:
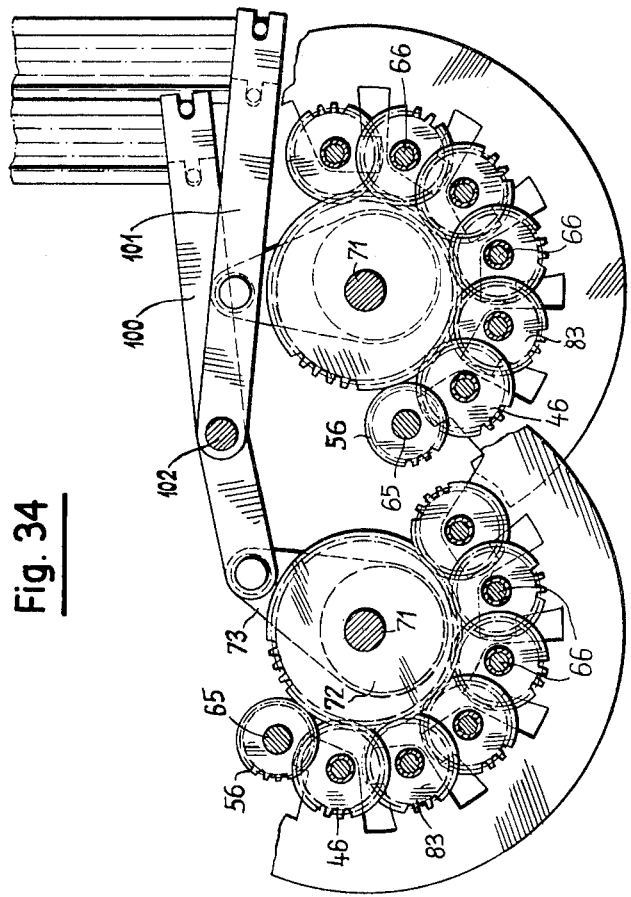
Figure 35:
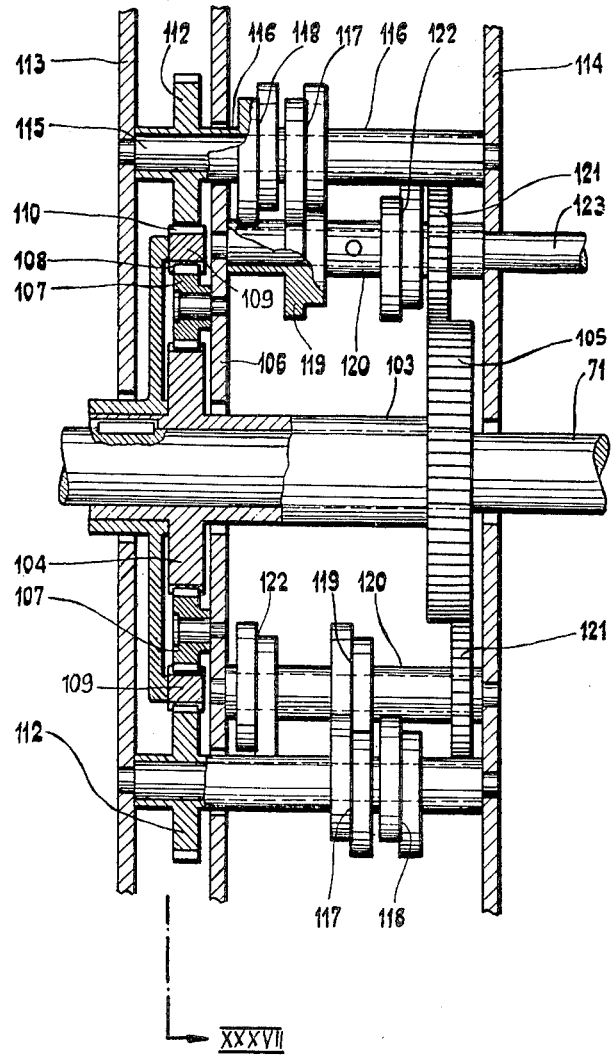
Figure 36:
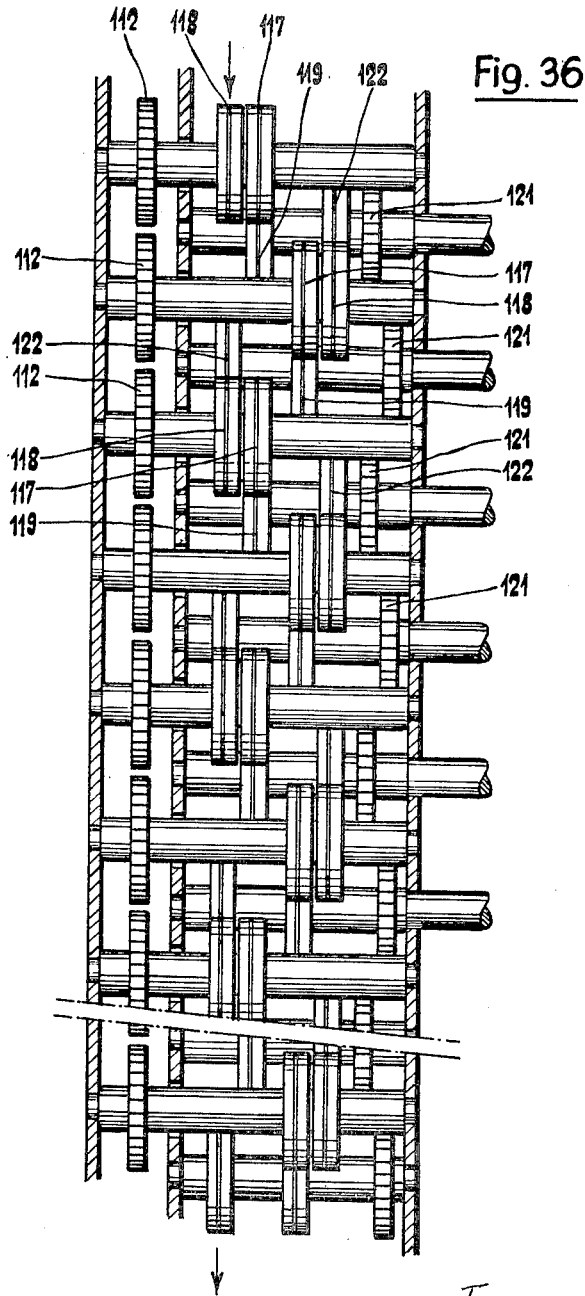
Figure 37:
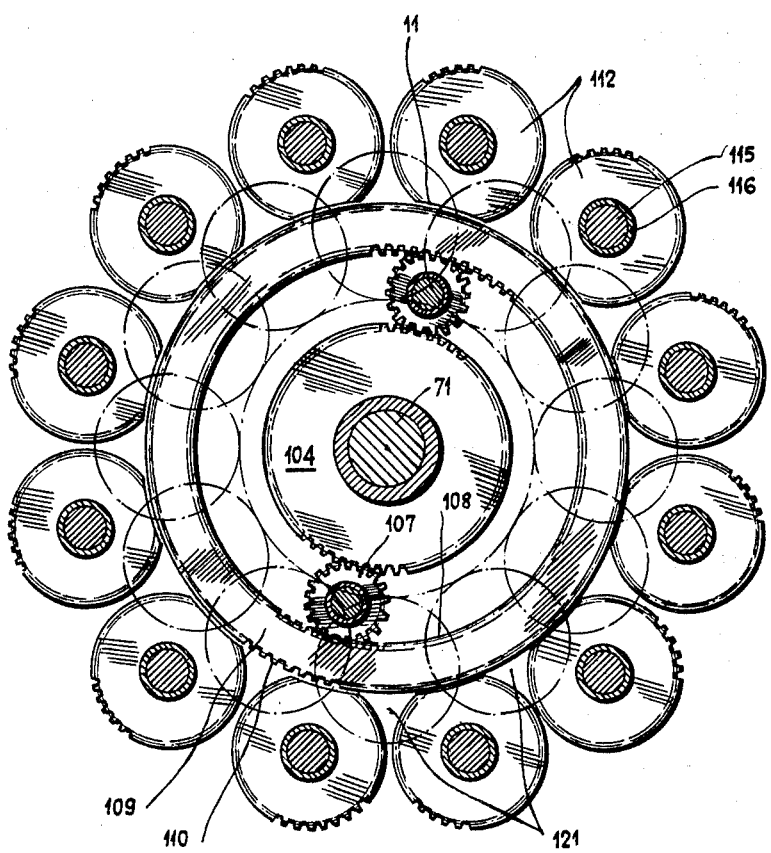
Figure 38:
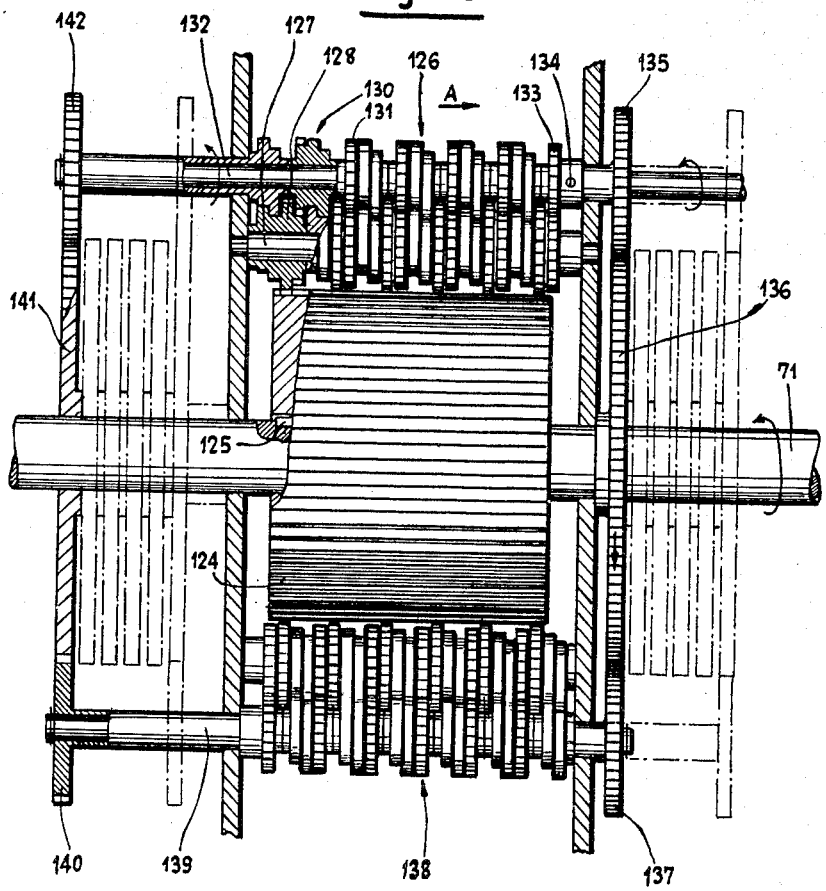
Figure 39:
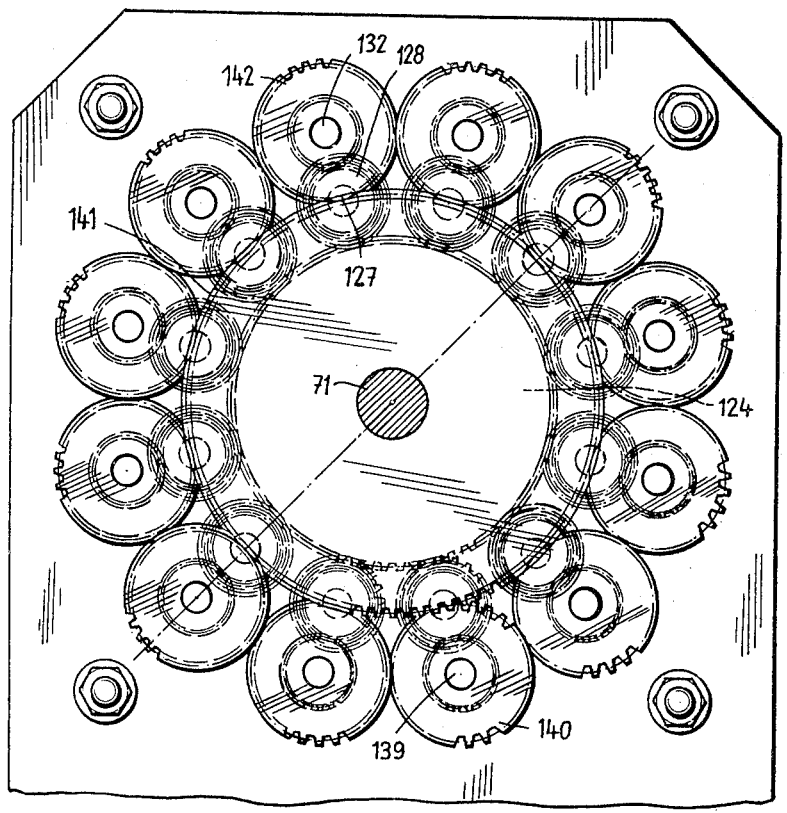
Figure 44:
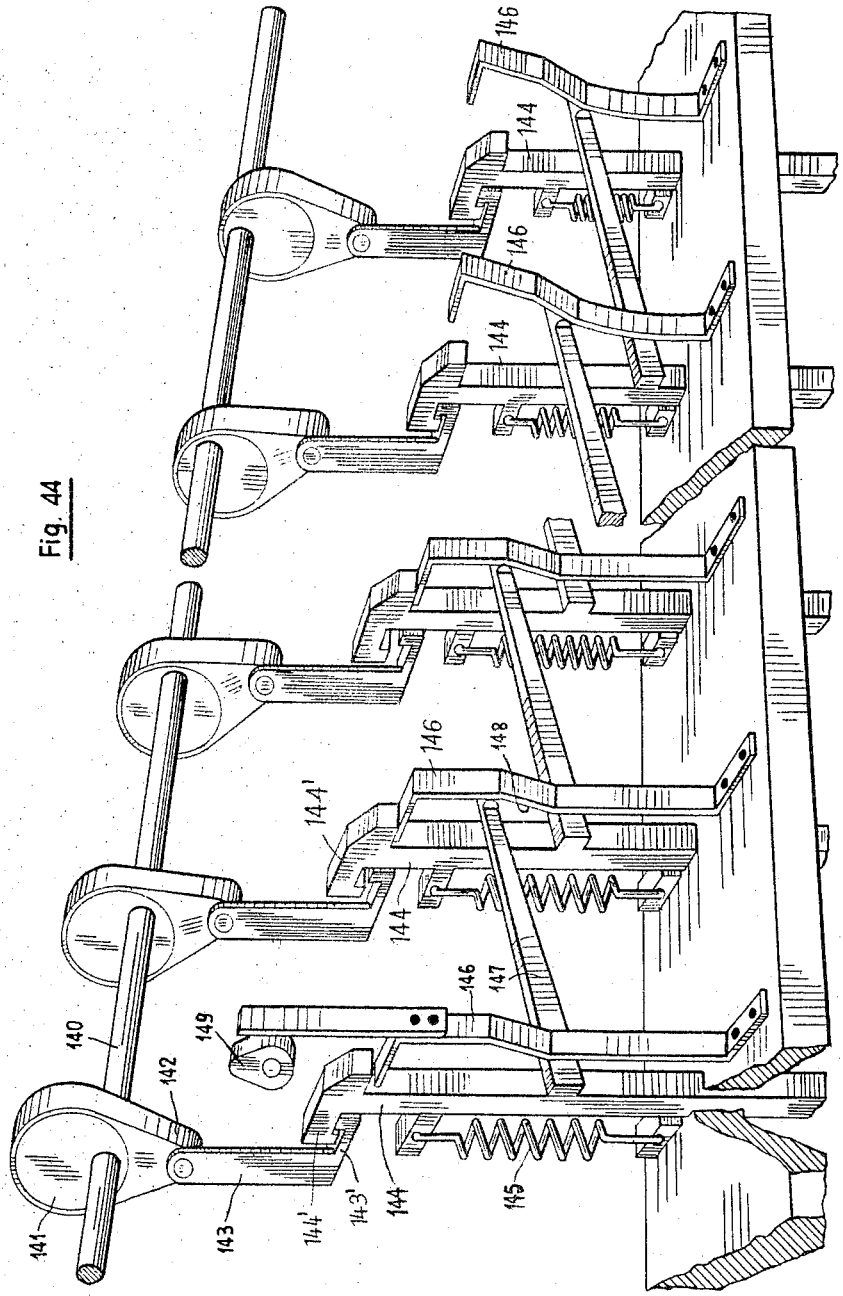
Figure 45:
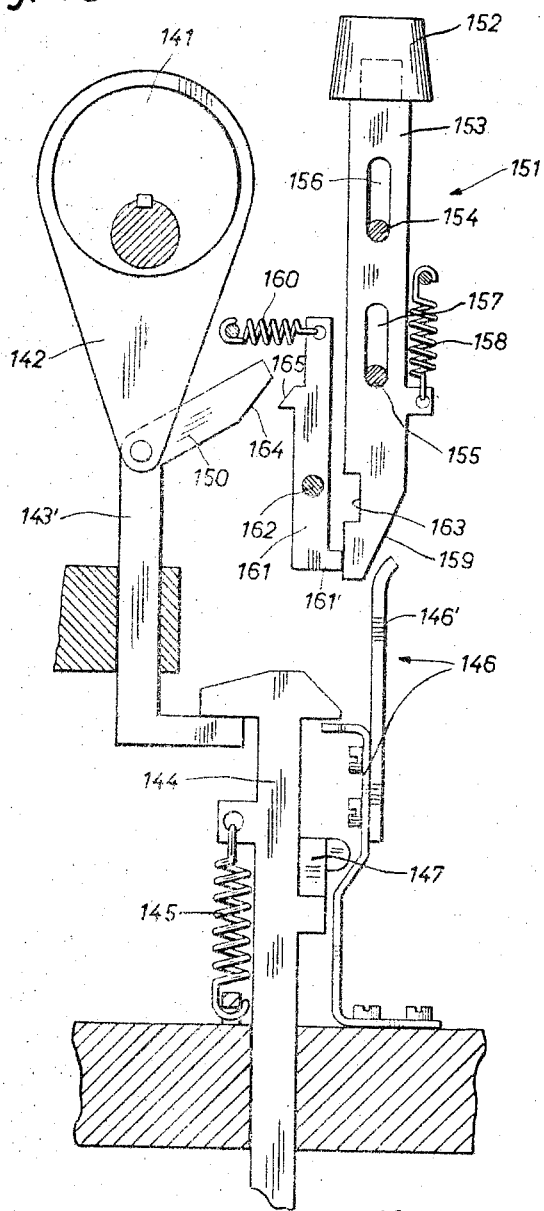
Figure 46:
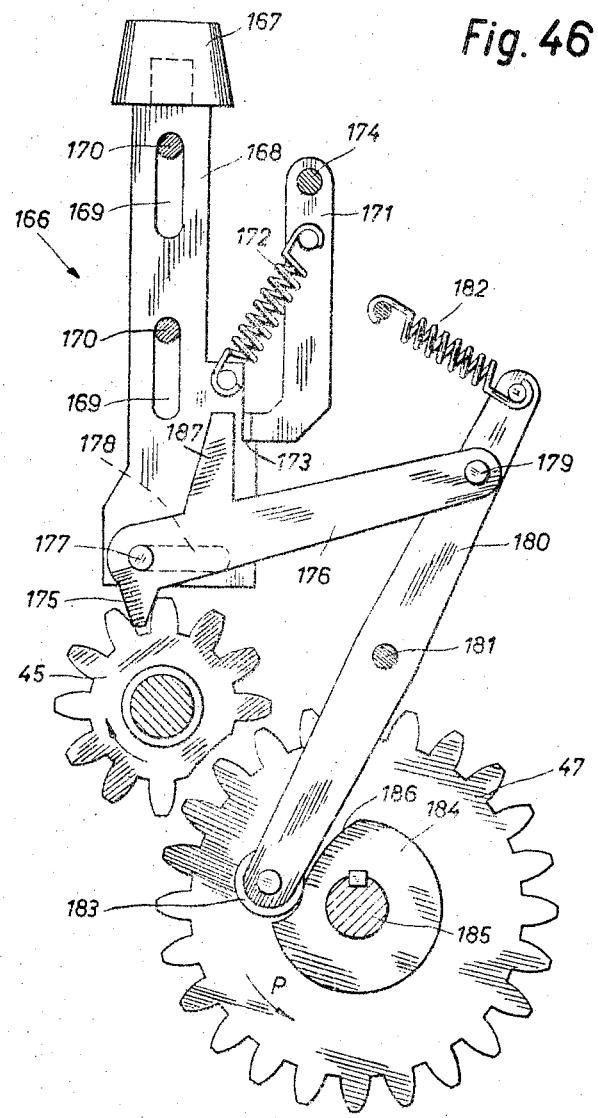

FIGURE 33 diagrammatically illustrates a composite arrangement of the previously-mentioned wave weaving loom;

FIGURE 34 illustrates a harness drive by means of two drive mechanisms or arrangements of the type according to FIGURE 28 and running in synchronism;

FIGURES 35, 36 and 37 illustrate a drive mechanism for controlling a harness drive, for example according to FIGURE 28, and constructed as closed storage means or energy storage device;

FIGURES 38 and 39 illustrate a modified drive arrangement for controlling, by way of example, the harness drive of FIGURE 28, and comprised of a plurality of closed storage means;

FIGURES 40 to 43 schematically depict different arrangements provided with a plurality of cooperating drive arrangements or mechanisms for controlling the selector element for the weft thread at a loom;

FIGURE 44 illustrates a further embodiment;

FIGURE 45 illustrates details of a keying- or switching-in apparatus for the embodiment of FIGURE 44; and FIGURE 46 illustrates a keying-in apparatus for the embodiment according to FIGURES 20–22 or for modified physical structures of this embodiment.

Describing now details of the invention and initially directing attention to FIGURE 1, it will be seen that such figure depicts a drive arrangement or mechanism constructed in accordance with the invention by means of which stepwise indexing wheels or gears 1, 2, 3, 4 and 5, are stationarily mounted in each instance upon a rotatably supported shaft 6, 7, 8, 9 and 10, respectively, such shafts for convenience in illustration only having been schematically depicted. The stepwise indexing wheels 1, 2, 3, 4 and 5, in the present embodiment, are assumed to embody gears, the toothed rim of which is always interrupted by a suitable recess 11. Each indexing gear 1, 2, 3, 4 and 5 is operably associated with drive means, in this case a drive gear 12, 13, 14, 15 and 16, respectively, and which in the illustrated position of FIGURE 1 of the relevant indexing gear is not in meshing engagement therewith by virtue of the provision of the aforementioned recess 11. However, after a small rotation out of the illustrated position the gear-tooth system of the indexing gears 1, 2, 3, 4 and 5 meshes with the corresponding gear-tooth system of the associated drive gear 12, 13, 14, 15 and 16, respectively, whereupon the relevant indexing gear is entrained for one revolution by its associated drive gear or wheel. In other words, in the present situation through one indexing step, and until such time as the driving connection is again interrupted by the corresponding recess 11 and the relevant indexing gear again comes to standstill. Moreover, the drive gears 12 to 16 are driven in synchronism with one another.

As can further be seen by inspecting FIGURE 1, the indexing gears 1 to 5 are connected in series by what has been termed herein starting or starter mechanisms 17, 18, 19 and 20, in each case arranged between two neighboring indexing gears. An additional starting mechanism 21 is connected in front of the indexing gear 1. Each starting mechanism is comprised of a primary element 22 and a secondary element 23, both constructed in the form of a cam disk. The primary element 22 of the starter mechanism 17 and the secondary element 23 of the starter mechanism 21 are rigidly seated upon the ends of the shaft 6, whereas the secondary element 23 of the starter mechanism 17 and the primary element 22 of the starter mechanism 21 are rigidly arranged upon the shafts 7 and 24, respectively. The illustrated arrangement, as should be clearly evident from the drawing, is effected such that during a revolution of the shaft 24 or 6 respectively, in the direction of rotation indicated by the arrows, the entrainment cams or cam portions 22a of the primary elements with a given rotational position come to act upon the entrainment cams or cam portions 23a of the secondary elements, to thereby effect entrainment of the corresponding secondary element 23 through a predetermined angle of rotation.

Furthermore, the arrangement is constructed such that, for example the starter mechanism 17 first comes into operable engagement or activity after a time lapse, that is after the indexing gear 1 has moved out of its illustrated rest position and has begun an indexing step. It should be apparent that the same holds true for the remaining starter mechanisms 18, 19, 20, the primary element 22 of which is always rigidly arranged upon the shaft of the indexing gear of the previous row and the secondary element 23 of which is always rigidly arranged upon the shaft of the indexing gear of the subsequent row. The shaft 10 of the indexing gear 5 carries at its end directed away from the starter mechanism 20 a primary element 22' adapted to cooperate with a secondary element (not illustrated), to thereby permit continuation of the row of interconnected indexing gears. On the other hand, this primary element 22' can cooperate with the secondary element of the starter mechanism 21; such possibility will be considered in greater detail as the description proceeds. At any rate, it can be ascertained and should be readily apparent that with the illustrated arrangement an optional number of indexing gears can be connected in series.

In the illustrated embodiment of FIGURE 1, the indexing gears 1, 2, 3, 4 and 5 are located in their rest position, whereas the associated drive gears 12, 13, 14, 15 and 16 rotate continuously—and as mentioned—in synchronism. Assuming now that the shaft 24 provided with the primary element 22 of the starter mechanism 21 is started to rotate in the direction of the associated arrow, then after a predetermined angular rotation the secondary element 23 of the starter mechanism 21 is entrained and the indexing gear 1 provided with the associated drive gear 12 is brought into meshing engagement and entrained by such drive gear 12 through one revolution, that is for a switching step. After a predetermined angle of rotation and, thus, with a time delay after initiation of a switching or indexing step, the cam 22a of the primary element 22 of the starter mechanism 17 becomes effective at the associated secondary element 23, whereby this secondary element 23 together with shaft 7 is placed in rotation in the direction given by the associated arrow. Consequently, the indexing gear 2 is placed into meshing engagement with the drive gear 13 and entrained by the latter through a switching step. The thus resultant rotation of the primary element 22 of the starter mechanism 18 causes, with the previously mentioned time-delay and via the secondary element 23 of the starter mechanism 18, engagement of the indexing gear 3 with the drive gear 14, whereupon this indexing gear 3 is also entrained through one indexing step. After the beginning of this indexing step the starter mechanism 19 becomes positively connected in the manner previously described, whereby the indexing gear 4 is placed in rotation and entrained by its drive gear 15. As a result, the primary element 22 of the starter mechanism 20 which rotates therealong effects the start of indexing wheel 5 at the proper time. In this manner, an indexing command imparted to the first indexing gear of the indexing gear row or the chain of indexing gears is delivered with a time-delay to the subsequent indexing gears, so that the indexing gears undertake an indexing step one row after the other and in spaced time intervals. The indexing command thus travels or wanders through the rows of indexing gears, whereby the operation can also be viewed in a manner that basically a movement, namely the indexing movement or a movement derivable from or taken-off such movement, travels through the rows of indexing gears.

Now, as soon as the first indexing command is already located at a given distance from the first operating zone or cell embodied by the indexing gear 1 with the associated elements, a further indexing command can be introduced into this first operating zone. The only condition decisive for the period of time in which a further indexing command can be introduced is that such further indexing command will only first then be delivered to the second operating zone or cell when the indexing gear 2 has come to rest. Apart from such, however, the period of time for introduction of a new switching or indexing command can be basically freely selected. It is also possible, under certain prerequisites, to impart to the first zone indexing commands with desired sequence in time, whereby the indexing commands and therewith the indexing sequence depicted by such—comparable to a pulse sequence or pulse train—travel through the rows of operating zones or cells. Within the possibilities offered by the number of operating zones as well as the previously-mentioned minimum indexing spacing, it is possible to reproduce every desired indexing sequence.

With the described drive mechanism or arrangement a secondary drive or power can be removed or tapped-off at a single or several locations, namely at any one or at each operating zone or cell, in order to displace in step-wise manner an operable member which is to be driven or a plurality of such members, whereby with the movement of one or each of the members the introduced indexing sequence can again be reproduced. If a plurality of such operable members are driven, for example a single one by each operating zone or cell, then such undertake their movement with a time-delay in a so-called wave-like manner by virtue of the predetermined indexing sequence. For this reason, the described drive mechanism can also be used to advantage for driving the warp thread control or the weft thread control of looms, particularly wave weaving looms. This possibility shall be explained with greater particularity hereinafter.

If, now, the last operating zone or cell of a row is connected with the first operating zone of the same row through the agency of a starter mechanism as already suggested, after a predetermined indexing sequence has already been introduced at the row of operating zones or cells then, and as should be self-evident, the indexing sequence which has already been introduced to the first operating zone is returned and thus again travels through the row of operating cells or zones. In other words, an introduced indexing sequence is thus stored in a closed row of operating zones or cells, that is a closed system is provided. Consequently, the driven member or members execute a periodic motion determined by the indexing sequence or repetition. A change-over to a different indexing sequence is readily possible if the closed row of operating zones or cells are temporarily opened, that is, the operable connection between the terminal operating zone and the initial or first operating zone interrupted, and there is introduced a new indexing sequence or repetition, whereupon the row of operating zones can again be closed.

Prior to describing further details of the invention there will now be indicated inherent possibilities of such a drive arrangement or mechanism. For purposes of simplification it has been assumed that a possibility of application relates to the harnesses of a loom, in particular a wave weaving loom. In order to simplify explanation and to provide for a better visual presentation thereof, reference will be made to a schematic or functional mode of representation which will be explained in greater detail hereinafter.

Moreover, and as should be apparent from the preceding description, in each instance every operating zone or cell comprises a control element, namely incorporating the relevant indexing gear provided with the associated elements of the corresponding starter mechanism, and further comprises a drive element, namely embodying the drive gear. It should be understood that with the selected manner of schematic representation and only for the sake of simplicity in explanation and illustration reference will be made to the embodiment of FIGURE 1; yet, it is to be distinctly understood further embodiments in which other types of stepwise indexing elements and/or drive elements can be employed are readily possible. Hence, in the selected schematic representation of FIGURES 2 to 7 an operating zone or cell is represented in each case by a surface enclosed by a full-line forming a block, such block being divided by a dashed line into a control portion— lying above such line in the drawing—and a drive portion.

Thus, FIGURE 2 depicts such an operating zone or cell 26 incorporating the control portion 26' and the drive portion 26". The arrow 27 appearing in the control portion 26' schematically represents an indexing command executed by operating cell 26 and delivered to the subsequent operating cell. FIGURE 3 illustrates an operating cell or zone 28 incorporating the control portion 28' and the drive portion 28" in basically the same functional or schematic representation, only different with respect to the enclosed surface of the block however. The arrow 27, in this case, also represents the completed and further delivered indexing command.

It should be apparent that an operating cell can also be placed in operable communication with more than one further operating cell by the provision of appropriate starter mechanisms. In FIGURE 4 there is depicted an operating cell 29, the control portion 29' of which is operatively connected with the control portion of two further operating cells by means of suitable starter mechanism. Consistent with the foregoing, it will be appreciated that the arrow or arrow portion 27 represents the executed indexing command, and the arrows 27' and 27" respectively, the transmitted indexing commands. If power is tapped-off from an operating cell or zone, then such power as depicted in FIGURE 5, according to which an operating cell 30 transmits an indexing command represented by arrow 27 to a neighboring operating cell, thus simultaneously transmits the indexing step via a power take-off or secondary drive portion 31 to an operable member to be displaced. As regards the operable member to be displaced, in the present situation such is assumed to have reference to a loom harness, schematically represented in FIGURE 6 by the element bearing reference character 32. Finally, FIGURE 7 depicts the operating cell 30 of FIGURE 5 with the loom harness 32 driven by such operating cell.

Keeping in mind what has been described up to now and particularly the functional diagrams of FIGURES 2 to 7, it will be seen that in FIGURE 8 there is schematically depicted an "open" row of operating cells incorporating the individual operating cells 26. The drive portions 26" thereof run synchronously with one another and the control portions 26' thereof are in operable connection with one another by means of starter mechanisms. Consistent with the previous "code or key" designations of FIGURES 2 to 7, here the arrows 27 indicate the manner in which the indexing commands are transmitted from one operating cell 26 to the other. On the other hand, in FIGURE 9 there is schematically represented a "closed" row of cells 26. It will be recalled such possibility was previously mentioned, and is here shown as composed of the individual operating cells 26 (cf. FIGURE 8), whereby the last operating cell 26''' for the purpose of transmitting the switching command is operably connected with the first operating cell 26'''' by means of a feedback coupling connection 33. With this drive mechanism or arrangement the indexing squence or repetition, as previously mentioned, continuously travels in a closed loop or cycle. Hence, it can be seen that the drive arrangement of FIGURE 9 provides what may be conveniently considered as a closed indexing sequence storage system.

Such a storage system, that is a "closed" row of operating cells, is also depicted in FIGURE 10 wherein the operating cells 26 are arranged in a circle and without the use of an actual feedback coupling conection form a closed row of operating cells. Also, in this case the drive portions 26" move in synchronism with respect to one another and the control portions 26' are operably connected with one another by starter mechanisms. By means of one of the operating cells 26, namely for example the operating cell 30 it is possible to drive a loom harness 32 which, then, executes a periodic movement corresponding to the stored indexing step sequence.

In FIGURE 11 there is depicted a closed row of operating cells, substantially corresponding to the arrangement of FIGURE 9, yet in this case incorporating the individual operating cells 30, wherein each such operating cell drives a harness 32. In this instance such an arrangement can, for example, have reference to the drive of a row of harnesses of a wave weaving loom, since these harnesses 32 driven by this drive arrangement respond to one and the same indexing command having a time-delay and thereby execute the desired harness movements.

A basically similar arrangement is presented in FIGURE 12 embodying a row of operating cells comprising individual operating cells 30 each provided with a power take-off or driving portion 31 as well as the individual operating cells 26, the latter of which in each instance are arranged between two individual operating cells 30. In this arrangement the last operating cell and the first operating cell are operatively interconnected by means of a feedback coupling connection 33. Hence, and as should be appreciated, the arrangement of FIGURE 12 in comparison with that of FIGURE 11 provides for the generation of a modified wave form.

Figure 13:
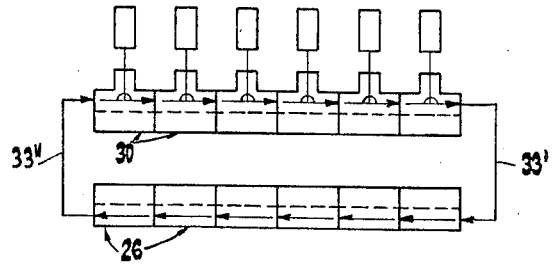

In the drive arrangement according to FIGURE 13 a row of operating cells arranged in the manner of FIGURE 11 and comprising the individual operating cells 30 is connected by means of feedback connections 33' and 33" with a row of operating cells arranged according to FIGURE 9 and comprised of the individual operating cells 26. In this arrangement, as compared with the arrangements of FIGURES 11 and 12, there can be stored a considerably longer indexing step sequence.

Figure 14:
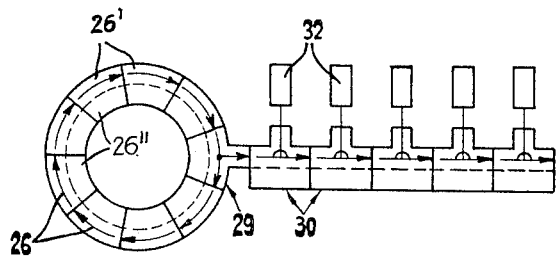

With the drive arrangement according to FIGURE 14 the operating cells 26 provided with an operating cell 29 form a storage means, whereby the operating cell 29 is connected in appropriate manner to the control portion of the first operating cell of a row of cells consisting of individual operating cells 30, in the manner of FIGURE 11. All of the operating cells hereof are synchronously driven. Each operating cell 30 drives a harness 32. An indexing step sequence stored in the closed storage means embodying the operating cells 26, 29 of this embodiment, is delivered to the operating cells 30 and thereby to the harnesses 32.

Figure 15:
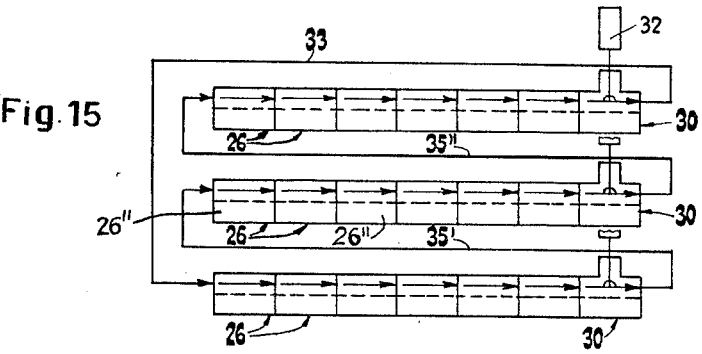

In the drive arrangement of FIGURE 15 three rows of operating cells, with each row being composed of operating cells 26 with one operating cell 30 as the last element, are connected in series by connections 35' and 35", and by means of a feedback connection 33 are operatively connected into a closed storage or so-called regenerative system. A harness 32 is driven by each row of operating cells 26. It is to be understood that the driving portions 26" of all the operating cells 26 in this instance are also synchronously driven. With such an arrangement an exceptionally large number of variation possibilities for the indexing step sequence are possible.

Figure 16:
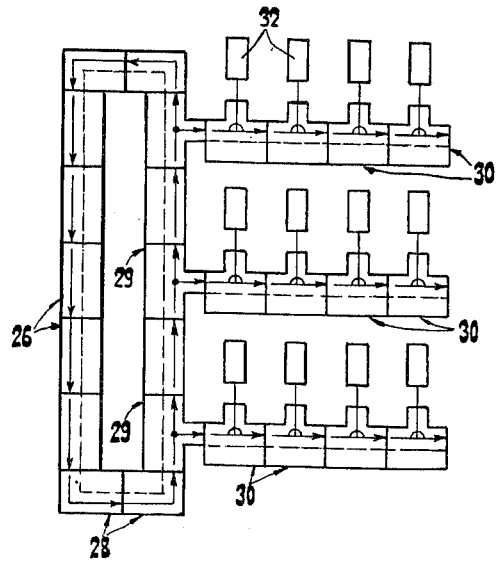

The closed storage system disclosed in FIGURE 16 incorporates operating cells 26 as well as operating cells 28 and finally operating cells 29, and wherein the operating cells 29 always deliver the indexing commands to a row of cells comprised of operating cells 30 which, in turn, each drive a respective harness 32. The driving portion of all of the operating cells moves in synchronism. In this arrangement the stored sequence of indexing steps possessing a delay in time are delivered to the row of operating cells 30. In this case, then, such an arrangement for example can be used to drive a number of harness rows of a wave weaving loom. In accordance with the time delay the third shaft of the lowermost row, the second shaft of the intermediate row, and the first shaft of the upper row, all as viewed from the left of the drawing, always execute the same movement.

Figure 17:
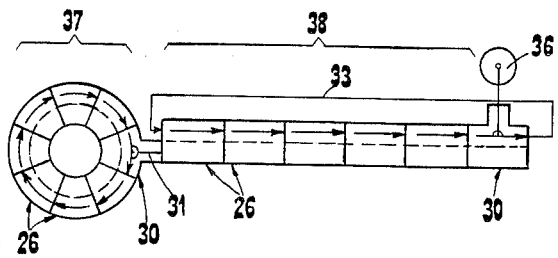

In the drive arrangement according to FIGURE 17 there is provided a storage system according to the arrangement of FIGURE 10 and composed of operating cells 26 with one operating cell 30, whereby the drive portion 31 of the operating cell 30 is coupled with the synchronous, for example common drive of a row of operating cells consisting of operating cells 26 and provided with one operating cell 30 as the last member. The last-mentioned row of operating cells likewise form a closed storage system, by virtue of a feedback connection 33, arranged in operable connection with a gear 36. Thus, with this drive arrangement there are provided basically two closed storage systems, of which the one indicated in the drawing by reference character 37 is coupled with the drive of the other such system, namely the storage means or system 38. An indexing step sequence stored in the storage means 38 is delivered to the gear 36, whereby, however, the indexing step sequence stored in the storage system 37 is decisive whether at a predetermined period of time there occurs further transmission of the step sequence in the storage system 38. The drive of the storage system 38 takes place from externally.

Figure 18:
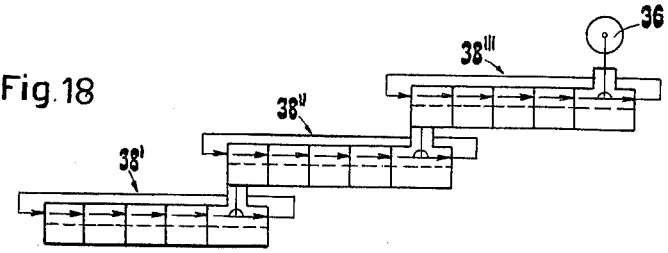

In the arrangement of FIGURE 18 there are provided three storage systems or means corresponding to the storage means 38 of FIGURE 17, and sequentially represented in a row in this figure by reference numerals 38′, 38″ and 38‴. The secondary drive or power take-off of the storage means 38′ is connected with the drive of the storage means 38″, and the secondary drive or power take-off of this storage means 38″ with the drive of the storage means 38‴. The storage means 38‴ influences the gear 36. The drive of the storage means 38′ occurs from the outside. The mode of operation corresponds, in the broader sense, to that of the drive arrangement of FIGURE 17.

In the previous discussion the different drive arrangement possibilities have only been briefly outlined. Moreover, oftentimes reference was made during such description to the application of the described drive arrangement with looms. Various details in conjunction with such a preferred utilization of the herein disclosed drive arrangements for looms will be presented in greater detail as the description proceeds. However, for clarity in explanation and illustration there will first be considered and explained certain concrete exemplary embodiments.

Initially, in this respect, there is to be considered a modified form of the drive arrangement according to FIGURE 1 which has been schematically depicted in FIGURE 19. To simplify matters, in this figure only a single location or operating cell provided with an indexing gear 1 and a drive gear 12 has been shown. The differences in physical structure between the drive arrangement of FIGURE 1 and that of FIGURE 19 only resides in the construction of the starter device or mechanism 39 and 40. In both cases, the relevant starter mechanism 39 or 40 incorporating a disk-like or plate-like constructed primary portion 41 possesses a lug or projection 42. This lug 42 is destined to engage with a slot 43 of the secondary portion 44, whereby in known manner there results a progressively accelerated movement of the secondary portion 44 and therewith the indexing gear 1, until the latter comes into meshing engagement with the drive gear 12. At the same time, the primary portion 41 momentarily functions as lock means for the secondary portion 44 before the starter mechanism becomes positively coupled and as stop means after termination of the indexing step. With such a construction of starter mechanism the further transmission of indexing commands can only take place in one direction. Nevertheless, it is possible to construct a basically similar starter mechanism functioning as lock means and stop means and produces an accelerated starter movement in such a manner that the transmission of the indexing commands can take place in both directions.

Such a drive arrangement is depicted in FIGURES 20 to 24, wherein in each of FIGURES 20 to 22 there is illustrated in enlarged view two operating cells in different indexing phases, and in FIGURES 23 and 24, likewise in enlarged view, details of the starter mechanism employed in this arrangement. As can be seen by inspecting FIGURES 20 to 22 the indexing gears 45, 46—which in this case are also provided with recesses 11 in the manner of the indexing gears of the drive arrangement of FIGURE 1—cooperate with drive gears 47 and 48 respectively. The secondary element 50 of the starter mechanism 51 is rigidly connected for rotation to the shaft 49 of the indexing gear 45. Upon the shaft 52 for the indexing gear 46 there is arranged the secondary element 53 of the starter mechanism 54. The primary element 55 of the starter mechanism 54 is rigidly connected for rotation with the shaft 49 of the indexing gear 45 through the agency of a pair of gears 56, 57. The arrangement with regard to the primary element 58 corresponds to what has just been described insofar as such relates to the connection thereof with the indexing gear of the non-illustrated previous operating cell.

The construction of the primary element and secondary element of the starter mechanism of this drive arrangement can best be ascertained by reference to FIGURES 23 and 24, whereby, however, in both of these figures both such elements of a starter mechanism are not arranged in superimposed relation, rather side-by-side. Let it be assumed that the starter mechanism 54 is under consideration. It will be seen that the primary element 55 possesses three circumferential or peripheral portions or sections 59, 60 and 61 which cooperate with the portions or sections 62, 63 and 64 of the secondary element 53. Moreover, the secondary element 53 possesses the same configuration as the primary element 55 with the sections 59′, 60′ and 61′, and in reverse manner the primary element possesses the peripheral sections 62′, 63′ and 64′ corresponding to the sections 62, 63 and 64 respectively. Thus, the primary element 55 and secondary element 53 can each consist of two plates or disks which bear against one another and are rigidly connected for rotation to one another, cooperating in pairs in the manner depicted in the drawing. Thus, as illustrated in FIGURE 23, the section 59 cooperates with the section 62 and the section 61′ with the section 64′ during acceleration of the secondary element 53. The cylindrical section 63′ in the rest position of the section 61′ serves as stop member.

In reverse manner, during delay of the primary element the section 59′ cooperates with the section 62′ and the section 61 with the section 64. The cylindrical section 63 in the rest position serves as stop for the section 61.

With the assistance of such a starter mechanism an indexing command is transmitted without shock, whereby by blocking between the primary element and the secondary element a positively coupled connection exists. Apart from this fact such a starter mechanism is in the position to transmit indexing commands in both directions.

In accordance with FIGURE 20 the starter mechanism 54 is just about to impart to the indexing gear 46 the indexing command after the indexing gear 45 has already undertaken a portion of its indexing step. The indexing gear 46 is now accelerated without shock and brought into meshing engagement with the drive gear 48, wherein FIGURE 21 depicts the position of the different members upon engagement of the indexing gear 46 with the teeth of the drive gear 48. The previous positively coupled connection of the primary element 55 and the secondary element 53 of the starter mechanism 54, which connection prevents an over-centrifugal action, is ended during this period of time. The secondary element is driven by the indexing gear 46 and the primary element by the indexing gear 45 almost up to the point of termination of the relevant indexing step.

FIGURE 22 depicts the position of the different elements upon termination of the indexing step executed by the indexing gear 45. The indexing gear 45 which is just about to disengage from the drive gear 47 must now be driven until its rest position, thereby however must be gradually delayed. For this purpose the peripheral section 59' cooperates with the peripheral section 62' and the peripheral section 61 with the peripheral section 64. In the rest position the cylindrical section 63 serves as a stop or impact member for the section 61 in order to prevent a possible reverse rotation of the indexing gear 45. A further rotation of this gear is prevented by the section 61' of the secondary element 50 of the starter mechanism 51, as best seen from FIGURE 22, said section 61' coming to bear at the periphery of the primary element 58 in the rest position of the indexing gear 45. Consequently the indexing gear 45 as well as the primary element 55 of the starter mechanism 54 are blocked, until either a further indexing command is introduced by the primary element 58 of the starter mechanism 51, or, upon reversal of the direction of rotation of the entire drive arrangement, an indexing command from the subsequent operating cell is returned by means of the secondary element 53 of the starter mechanism 54 in the direction towards the indexing gear 45.

The introduced indexing command with this drive arrangement is thus also transferred from one operating cell to the other with a delay in time, whereby, however, a return of the indexing command is likewise possible. After execution of the indexing command the indexing gears again return to their rest position and are always forcibly driven in this position, as well as also during the execution of an indexing step. The acceleration and the delay of the indexing gears is progressive and takes place without jolts. It is to be clearly understood that, on the one hand, the number of operating cells arranged in series or in a row relative one another can be as large as desired, and that, on the other hand, all of the possibilities depicted in conjunction with the description of FIGURES 2 to 18 are capable of realization. It is further to be appreciated that each heretofore described starter mechanism can be considered as providing a drag-type coupling incorporating a dragged coupling portion and a dragging coupling portion, wherein each indexing gear has connected for rotation therewith the dragged coupling portion of a previously arranged starter mechanism and the dragging coupling portion of a subsequent arranged starter mechanism.

Figure 25:
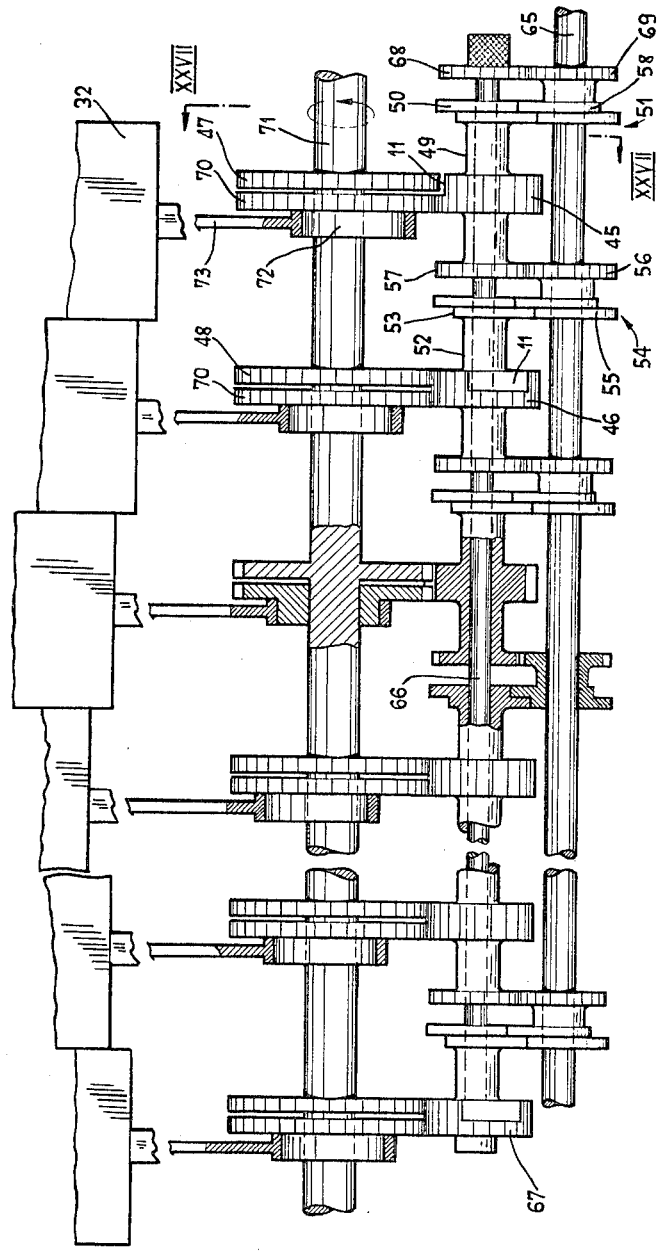
FIGURE 25 illustrates a drive arrangement of the invention for driving the harnesses of a wave weaving loom, such drive arrangement basically corresponding to the embodiment depicted in FIGURES 20 to 22.

A practical embodiment of the drive arrangement according to FIGURES 20 to 22 is illustrated in FIGURES 25 to 27, whereby a harness of a complete row of harnesses of a loom is driven by each operating cell. A total of six operating cells are present, whereby the first such cell is arranged at the right of the drawing. Particularly designated are—with exceptions still to be mentioned—only the elements or members of the first and second operating cell, whereby for the relevant members the same reference numerals have been employed as in FIGURES 20 to 22. The primary elements 58 and 55 of the starter mechanisms 51 and 54 respectively, as well as the primary elements of the remaining operating cells are loosely mounted upon a stationary shaft 65. On the other hand, the secondary elements 50 and 53 of the starter mechanisms 51 and 54 respectively, are rigidly arranged for rotation in each case upon the hollow constructed shafts 49 and 52, respectively, of the associated indexing gears 45 and 46 respectively. The hollow shaft 49 and 52, in turn, are loosely arranged upon a rotatably mounted shaft 66, in other words rotatably arranged. The arrangement is the same with respect to the remaining operating cells.

The shaft 66 on the other hand is rigidly connected for rotation with the indexing gear 67 of the last operating cell arranged at the left side of the drawing, and carries at its other end for rotation therewith a gear 68 which, in turn, meshes with a gear 69 rigidly connected for rotation with the primary element 58 of the starter mechanism 51. As can be clearly seen by making reference to the first two operating cells, the recesses 11 do not extend through the full width of the toothed rim of the indexing gears 45 and 46, so that these indexing gears, as well as in the other cases, possess a complete tooth rim portion which meshes in each case with a power take-off or secondary drive gear 70 (see FIGURE 26). The secondary or power take-off drive gears 70 are rotatably mounted upon a common drive shaft 71 of the drive gears 47, 48. Each power take-off gear 70 drives an eccentric 72 which moves the associated harness 32 through the agency of a connecting rod 73.

The mode of operation of the just-described drive arrangement should be apparent from previous explanations. The introduce indexing step sequence travels through the row of operating cells and is returned from the indexing gear 67, by means of the shaft 66 providing a feedback connection, to the starter mechanism of the first operating cell. The harnesses 32 are displaced in a wave-like motion or movement in accordance with the corresponding indexing step sequence. A clearer showing of details of this arrangement can readily be ascertained without further explanation from FIGURES 26 and 27 which, in comparison with FIGURE 25, are shown in a larger scale.

A possibility of arranging or orienting a plurality of drive arrangements according to FIGURES 25 to 27 for the drive of a plurality of rows of harnesses is depicted in FIGURES 28 and 29. For the sake of clarity in explanation, in both of these figures the same reference numerals previously used in conjunction with FIGURES 25 to 27 are again employed for corresponding elements, and as the case may be in modified form. In this arrangement, the shaft 65 as well as a plurality of shafts 66 are arranged concentrically about a common drive shaft 71 (FIGURE 28). The shaft 65 carries the primary element of the first drive arrangement corresponding to the drive arrangement of FIGURE 25, whereby in FIGURE 29 the portions or elements of an intermediate drive shaft are provided with the reference characters of an intermediate, namely the second drive shaft according to FIGURE 25. In this case the indexing command travels from the left towards the right, and indeed from the hollow shaft 49 via the intermediate pair of gears 57/56 to the primary element 55 of the starter mechanism 54 and from such via the secondary element 53 to the hollow shaft 52 of an indexing gear 46, such shaft being rigidly connected with the secondary element 53. The intermediate gear 74 is connected for rotation with the hollow shaft 52 and the intermediate gear 75 meshing with this gear 74 transmits the indexing command to the subsequent starter mechanism 76. The return of the indexing step sequence to the first operating cell of this row takes place in the same manner as described in conjunction with FIGURE 25.

Furthermore, in this embodiment the primary elements of the starter mechanisms of the second row of drive or operating cells are, in each case, rotatably mounted upon the hollow shafts of the indexing gears of the previous row. Thus, for example, there is arranged upon the hollow shaft 52 a primary element 77 together with the intermediate gear 78 rigidly connected for rotation with the primary element 77, whereby the intermediate gear 78 takes over or receives the indexing commands from the indexing gear 80 via the intermediate gear 79. The primary element 77 cooperates with a secondary element 81 which is rigidly connected for rotation with the hollow shaft 82 of an indexing gear 83 of the subsequent drive or operating cell. The hollow shaft 82, in turn, carries a primary element 84 which already belongs to the third row. In accordance with the aforementioned particulars it is possible to easily reconstruct the entire system of this multiple-drive arrangement.

A drive gear is always associated with the indexing gears of the individual rows, whereby the drive gears rigidly connected for rotation with the drive shaft 71 are laterally offset or displaced in accordance with the location or position of the associated indexing gears. Next to each drive gear in each case there is located the power take-off 70 with the eccentric 72 associated with the relevent indexing gear. As can be seen from FIGURE 28, the connecting rods 73 engage in each case with a pivotable lever 85. The pivotable levers are pivotably mounted upon a common shaft 86 and engage at their other end in each instance with a harness 32. The harnesses 32 are arranged in a number of rows, as can best be seen from FIGURE 28.

FIGURES 30 to 32 illustrate the harness arrangement of a wave weaving loom provided with six harness rows incorporating the harnesses 32 controlled by a drive arrangement according to FIGURES 28 and 29, and wherein FIGURES 30 and 31 indicate in each case the position of three harness rows at a predetermined period of time. Above all, the wave-like shed formation is readily discernible, and further the position assumed by the shuttles during this period of time in the wave-like shed. If the speed reduction between the indexing gears and the power take-off gears is selected in the ratio of 2:1, in such case the power take-off gears execute half of a revolution during each indexing step, whereby the harnesses in each case are moved out of one end position into the other and remain in one of the end positions until the next indexing step. The indexing commands for a harness group 32a (enclosed in FIGURE 32 with a phantom line) always take place at the same time, so that all the harnesses of one group which have to be moved execute their movement conjointly. The harnesses 32 undergo a sinusoidal movement since in each case they are displaced by an eccentric, whereby, however, the harness groups 32a perform such movement with a time delay, whereby in the direction of the weft there appears the desired warp thread wave which continues through the fabric width as soon as the drive shaft beings to rotate.

It is thus clear that the indexing step sequence introduced to the drive arrangement and, as the case may be, stored therein, is decisive or controlling for the pattern of a fabric. The quality of the pattern simply depends upon which of the first harnesses of each harness row are moved during each operation or cycle of the weaving machine. The transmission of the corresponding harness movement to the remaining harnesses of the same harness row then occurs automatically, as already explained. The introduced harness configuration is thus maintained and travels with the associated shuttle over the entire cloth width. The same weft thread is thus evenly interlaced throughout the entire cloth width, while the harnesses during passage of the subsequent shuttle can already assume a different relative position and thereby produce a different interlacement.

The entire arrangement of a wave weaving loom equipped with the described drive arrangement is schematically depicted in FIGURE 33. In accordance therewith it will be seen that a warp beam 89 is arranged in a machine frame 88, from which beam the warp threads 90 extend via a back rest 91 to the shed point or feel 92. The woven cloth or fabric material 93, in turn, travels over guide rollers 94 to the cloth beam 95. The shuttles 96 are moved by the mechanism or installation 97 through the shed 98, whereas the warp control is effected with the aid of the harnesses 32 from a drive arrangement, as described, and generally designated by reference character 99. For example, this drive arrangement can correspond to the embodiment of FIGURES 28 and 29, or to a different embodiment, as for example illustrated in FIGURE 34 now to be considered.

With this last-mentioned embodiment there is basically concerned two drive arrangements constructed according to FIGURES 28 and 29, however in this instance coupled to one another and synchronized. In view of the extensive previous discussion of the drive arrangement of FIGURES 28 and 29, the physical structure and mode of operation here depicted should not require any further detailed explanation. The connecting rods of the one drive arrangement are operable via lever means 100 and the connecting rods of the other drive arrangement via lever means 101 upon the associated harnesses. The levers 100 and 101 are rockably mounted upon a common shaft 102. With such an arrangement twelve rows of harnesses can be controlled, all of which lie adjacent one another and together form a single shed.

With the described multiple-drive arrangements the individual rows of operating cells are arranged stacked next to one another and within one another such that there results a space requirement which is as small as possible. At the same time each harness row is independent of the other rows. Only the drive of the harness rows is common, whereby the movements of the harnesses are synchronized with one another by means of the common drive. If the drive rotational direction works in reverse manner, then, and as already mentioned in conjunction with FIGURE 25, the indexing step sequence is transmitted in the opposite direction from one operating cell to the other, whereby the warp thread wave likewise travels in the opposite direction. This possibility of operation can be advantageously employed during de-weaving in that the machine is slowly turned back in order, for example, to be able to remove a ruptured weft thread. If after de-weaving the machine is again placed into operation, then there does not appear a pattern error because first of all the previously effected movements which, however, have been annulled during de-weaving, are repeated.

In FIGURES 35 to 37 there is illustrated a drive arrangement which can be employed as closed storage system for controlling the rows of operating cells of the drive arrangement according to FIGURE 28. In this case there is concerned an arrangement as depicted principally in FIGURE 16. According to FIGURE 35, a hollow shaft 103 is keyed to the elongated drive shaft 71 of the drive arrangement according to FIGURE 28. The hollow shaft 103 carries at both of its ends a gear 104 and a gear 105 rigidly connected for rotation with such hollow shaft. The gear 104 meshes via an intermediate gear 107 mounted in a stationary wall 106 with the internal gearing 108 of a gear 109, the external teeth 110 of which cooperate with the teeth of indexing gear 112. As can best be seen in FIGURE 37, an entire number of indexing gears 112 are arranged about the gear 109, wherein in the illustrated rest position all of the recesses 11 of these indexing gears 112 face towards the gear 109. The indexing gears 112 in each case are rotatably mounted upon a shaft 115 supported in walls 113 and 114 and connected with a hollow shaft 116 which, in turn, carries the primary element 117 and the secondary element 118 of a starter mechanism. The primary element 117 in each case cooperates with a secondary element 119 which is rigidly connected for rotation by means of a hollow shaft 120 with an indexing gear 121 as well as with a further primary element 122, and finally, with a shaft 123 rotatably mounted in the walls 106 and 114. The primary elements 122 of the hollow shaft 120, in turn, in each case are in operable connection with the secondary element of a hollow shaft 116. The indexing gears 121 are driven through one indexing step by means of the drive gear 105. The indexing command is transmitted from six indexing gears 121 via the shafts 123 each time to a row of operating cells of the drive mechanism according to FIGURE 28.

An indexing step sequence stored in the drive arrangement of FIGURE 35 wanders in a circle through the alternating sequence of rows of indexing gears 112 and 121 following one another, whereby the rows of operating cells of the attached drive arrangement according to FIGURE 28 are correspondingly controlled. The stored indexing step sequence can be introduced in the manner already described at the outset, in that the rows of operating cells are opened, for example by removing an indexing gear, and after introduction of the indexing step sequence are again closed. The altering or change of the stored indexing step sequence is under these circumstances extremely simple. The introduction or input of the indexing step sequence can also take place with the aid of an input or "read-in" device which is not here described, but which will be considered in greater detail hereinafter. With the aid of such an arrangement it is possible to produce the same pattern as with a so-called eccentric threadle motion (for classical looms) for six harnesses with six equal eccentrics divided into twelve segments.

A further variant for controlling the six rows of operating cells of the drive arrangement according to FIGURE 28, or however, merely to drive six harnesses is depicted in FIGURES 38 and 39. A gear drum or roller 124 is seated upon the elongated drive shaft 71 of the previously mentioned drive arrangement and which provides a common drive for the individual indexing gears. The drum 124 is keyed at 125 to the drive shaft 71. In order to control a row of operating cells of the drive arrangement according to FIGURE 28, in this case there is in each instance provided an arrangement designated by reference character 126 and similar to that of FIGURE 25. Six indexing gears 128 are rotatably arranged upon a shaft 127, these gears being operably connected with one another by starter mechanisms 130 and intermediate pairs of gears 131 in accordance with the teachings of FIGURE 25. The secondary elements of the starter mechanisms are arranged upon a common shaft 127 of the indexing gears 128, whereas the primary elements are rotatably mounted upon a shaft 132 together with the intermediate gears connected with them. A gear 133 meshing with the intermediate gear of the last outer indexing gear at the right of the drawing is, at 134, rigidly connected for rotation with the shaft 132 and, additionally, by means of a hollow shaft is rigidly connected for rotation with a gear 135. The shaft 132 further transmits the indexing commands externally.

The indexing step sequence moves in the drawing from the left to the right in the direction of the arrow A, and, on the one hand, is delivered by the last operating cell to the shaft 132, as mentioned, and, on the other hand, is returned to a row of operating cells designated by reference numeral 138 via the gear 135 meshing with an intermediate gear 136 and finally a further gear 137 operated by gear 136. This row of operating cells 138 is identical to the row of operating cells 126 and arranged diametrically opposite to the same. From the last operating cell of the row of operating cells 138 the indexing commands are returned to the primary element of the first operating cell of the operating cell row 126 through the intermediary of a shaft 139, a gear 140 rigidly connected for rotation with the aforesaid shaft 139, the gear 141 and finally the gear 142. Basically speaking, in this instance there is provided a feedback connection which in contradistinction to that of FIGURE 25 embodies a further row of operating cells, so that the stored pulse sequence can be considerably longer.

In order to control six harness rows there are provided six such closed groups consisting of two rows of operating cells situated in diametrically opposed relation to one another, which with respect to one another are offset or displaced in circumferential direction. As indicated in FIGURE 38 the intermediate gears 141 and 138 as well as the gears meshing with them are displaced in axial direction. It is to be understood that the intermediate gears 136 and 141 are rotatably mounted upon the drive shaft 71. The storage capability of such an arrangement is exceptionally large and it is possible to produce the same patterns as with a dobby of classical looms. Moreover, within the available possibilities it is however possible to readjust or change-over as desired and easily, in that for each harness row a different indexing sequence can be stored which can be carried out with the aid of an appropriate read-in or keying-in device.

A further possibility for using the inventive drive arrangement in conjunction with looms occurs with weft thread control. FIGURES 40 to 43 illustrate exemplary embodiments in this respect.

Figure 40:
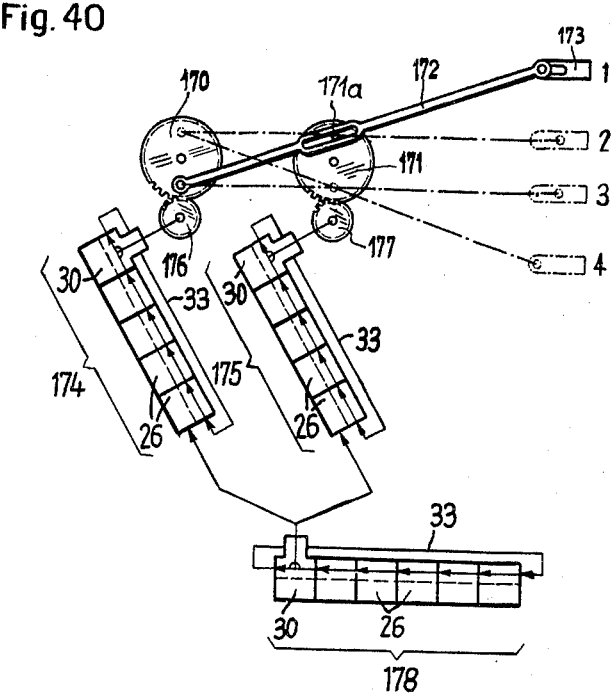

In accordance with FIGURE 40 two eccentrics 170 and 171 operate in known manner upon a selector element 173 through the agency of a connecting lever 172. Each of the eccentrics 170 and 171 are driven via respective gears 176 and 177 by means of a row of drive or operating cells 174 and 175, respectively. The speed reduction between the gears 176 and 177 and the associated eccentrics 170 and 171 respectively, is assumed to amount to 2:1 for example. The drive of the row of operating cells 174 and 175 is derived from a further row of operating cells 178 which, like the row of cells 174 and 175, are constructed as closed storage means or system. As indicated in FIGURE 40, at the end of an indexing command the eccentrics 170 and 171 assume one of the two possible positions, whereupon the eccentric pin 171a acting upon the connecting lever 172 is located either upwardly or downwardly. Consequently, there results four different relative positions of both of the eccentrics 170 and 171 and accordingly four different positions of the selector lever 172. It is to be understood that depending upon whether the eccentrics 170 and 171 execute one-half of a revolution individually or collectively, all lever positions are directly attainable from the momentary previous lever position. Of course, the one-half revolution of the eccentric takes place in rhythm with the machine. In consequence thereof, both of the storage system or means 174, 175 as well as also the storage means 178 travel in synchronism with the machine in that the indexing steps take place in cadence or rhythm with the machine. Accordingly, the infed indexing step sequence travels with the same speed through each storage means. The existing position of the lever 172 is determined by the indexing sequence stored in the storage means 174 and 175, wherein the indexing sequence stored in the storage means 178 is decisive for the fact whether during a given machine cycle or cadence the lever 172 in accordance with both of the first mentioned indexing sequences is to be changed-over or remain in position.

Figure 41:
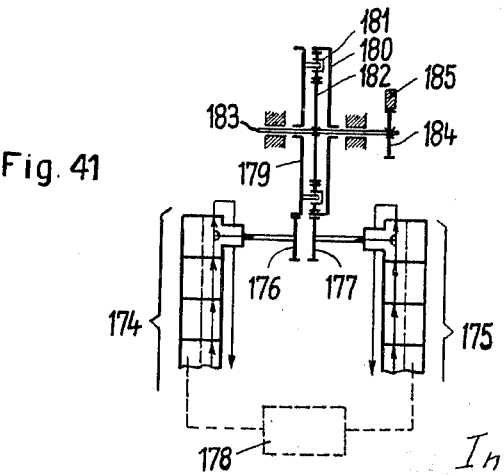

According to FIGURE 41 the same storage combination 174, 175 and 178 is arranged in operable connection with a summation drive. The gear 176 engages with a gear 179 and the gear 177 with a gear 180. The gear 179 carries the planet pinions 181 which mesh with an inner or internal gear 182 and the external gear 180.

The inner gear 182 is rigidly mounted for rotation upon a shaft 183 which carries both of the gears 179 and 180 so as to be freely rotatable. A drive gear 184 engaging with a rack 185 is rigidly connected for rotation with one end of the shaft 183.

Both of the gears 176 and 177 undergo a revolution in the same direction during each indexing step which effectuates a partial revolution of the gears 179 and 180 respectively. Assuming now that, for example, only a single revolution of the gear 177 takes place while the gear 176 is at standstill with the gear 179, then the planet pinions 181, likewise stationary with respect to their path of movement, transmit the rotational movement via the inner gear 182 and the gear 184 to the rack 185 which is then displaced through one step. It has been assumed for the sake of clarity in illustration and explanation that, for example, this rack displacement which has been effected by rotation of the gear 177 is directed rearwardly of the plane of the drawing. During a rotation of the gear 176, and as should be clearly evident from the drawing, the rack 185 undergoes a displacement in the opposite direction, that is forwardly of the plane of the drawing, and indeed, this movement of the rack 185 is twice as large as in the previous situation in accordance with the selected transmission or the transmission difference at the driving connection. It is possible to interpret such movements in a manner that, in the first situation the rack 185 has executed a positive (+1) step, and in the second situation two negative (−2) steps.

Now, if the gears 176 and 177 rotate simultaneously then the movements are added at the shaft 183 and thereby at the rack 185 which, corresponding to the equation +1−2=−1, executes a step in the negative direction, that is as viewed in the drawing towards the front. Thus, the rack 185 can execute the steps +1, −1 or −2 during each machine cycle or cadence and, if the starting position is taken into consideration, can in any case assume one of four possible positions. Thus, first of all four different weft threads can be selected, for example four colors. The number of weft threads is however not yet exhausted since the rack 185, of course, can also execute more steps behind one another in each direction and thereby can also attain further positions. In comparison with the variant of FIGURE 40, in the present case it is possible to also achieve a larger number of positions of the selector element, whereby, however, the selector element in this case cannot directly reach every other position from a given position. If this condition is related to the "must" position, then it is clear that with the embodiment of FIGURE 41 not as many colors are directly attainable and each are not attainable from the other. On the other hand, however, a large number of different colors can be employed and the individual colors can repeat themselves at a plurality of positions.

Figure 42:
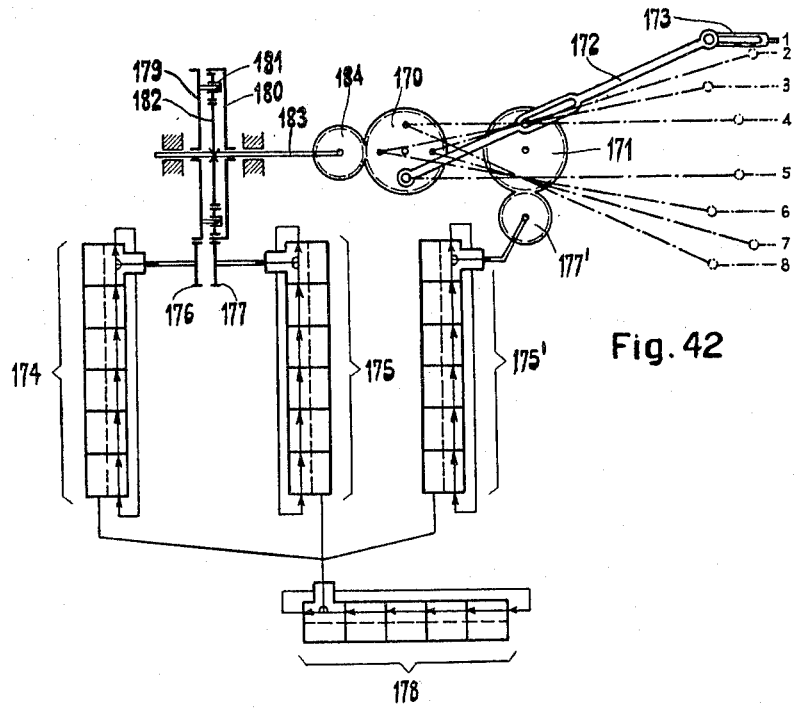

In the embodiment according to FIGURE 42 there is depicted the combination of the variants of FIGURES 40 and 41, whereby for convenience the same reference numerals have been employed for the same or similar elements. Under these circumstances a recapitulation of the details of the arrangement would appear unwarranted. In this embodiment in addition to taking-off the drive for the storage means 174 and 175 from the drive arrangement 178 there is also removed from such drive arrangement the drive for storage means 175′ which activates an eccentric 171 via the gear 177′. The eccentric 170 is influenced by both of the storage means 174 and 175, whereby the indexing commands of the storage means 174 effect one-half of a revolution and the indexing commands of the storage means 175 a quarter of a revolution of the eccentric 170. As a result, two additional positions are provided for the eccentric 170, and four additional positions for the selector lever 172, thus for the latter a total of eight different positions. During infeed in accordance with the indexing step sequence each of these eight positions can be directly reached from every other position. Quite obviously, what has previously been explained in conjunction with the description of FIGURES 40 and 41 can be correspondingly applied in conjunction with the function of the arrangement according to FIGURE 42.

With the arrangement according to FIGURE 43 there are again provided drive storage means 174, 175, 175′ and the non-illustrated drive storage means 178. The drive storage means 174 operates in similar manner to the corresponding struction of FIGURE 41 via a gear 176 upon the planet gear carrier or epicyclic unit 179 of a summation drive, the external or outer gear 180 of which in this case is not directly connected with the gear 177 of storage means 175, rather via a further summation drive. Both of the summation drives are identical and, thus, for the same elements the same reference numerals are employed, with the exception that in one case such reference numerals have affixed thereto a prime (′) marking. The arrangement is constructed such that the external gear 180 is in engagement with the epicyclic unit or planet gear carrier 179′ of the second summation drive, the external gear 180′ of which meshes with the gear 177. The shaft 183′ is driven from the storage means 175′ through the agency of a gear 184′ and a gear 177′. The shaft 183 again drives a rack 185 through the agency of a gear 184.

Figure 43:
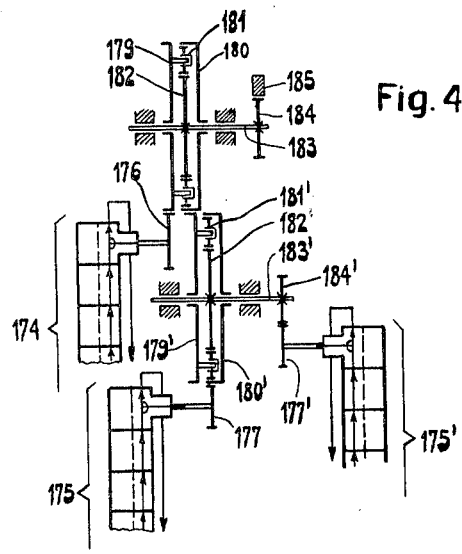

When applying in analogous manner what has already been previously explained in the same or similar environment, it will be seen that in FIGURE 43 the selector rack 185 with corresponding selection of the transmission and upon execution of a unidirectional rotation of the elements 176, 177 and 177′ performs the following steps:

due to storage means 174: −3
due to storage means 175: +2
due to storage means 175′: +1

Since these steps can take place individually or in combination during a machine cycle or cadence it should be apparent that the following direct steps are possible:

+1+2=+3
+2
+1
Null
+2−3=−1
+1−3=−2
−3

Furthermore, it should be recognized from the preceding table that six different steps are possible from the starting position, in other words six different threads or yarns can be selected for example. Insofar as it is nonetheless desired to be able to select one color directly after another then the number of colors is reduced to four, since the largest step in the positive or negative direction amounts to three. In this respect the arrangement is thus equivalent to that according to FIGURE 40. On the other hand, however, in accordance with the embodiment of FIGURE 41 basically an unlimited multiplicity of colors or color regions can be accommodated. A program change-over is also in this case easy to accomplish in the concrete or suggested manners previously outlined.

A basically similar drive arrangement as regards the practical implementation, yet an essentially different constituted drive arrangement is depicted in FIGURE 44. To simplify explanation, in this instance it is also assumed that the illustrated arrangement is employed to drive a row of harnesses of a wave weaving loom. According to this figure, slider means 143 are suspended via connecting rods 142 upon respective eccentrics 141 rigidly arranged for rotation upon a shaft 140. These slider means each engage beneath the head 144′ of a harness carrier 144 by means of their flexed end 143′. It is to be understood that the slider means 143 as well as also the harness carriers 144 are displaceably guided in any suitably non-illustrated manner. The harness carriers 144 each support at their lower end a non-illustrated harness. Each harness carrier 144 is pulled downwardly under the action of a spring 145 and in the rest position against a locking pawl or detent 146 resiliently engaging beneath the head 144' of the associated harness carrier 144.

Furthermore, each harness carrier 144 is provided with a rigid or stiff arm 147 which engages between the next following harness carrier 144 and the therewith associated locking pawl 146 and during a downward movement of a harness supported by the associated harness carrier 144 this arm 147 comes to act upon a surface 148 of the locking pawl 146, such surface 148 being inclined in respect of the harness movement. As can be clearly seen with both of the harness carriers 144 disposed at the right-hand side of the drawing, the relevant locking pawl 146 is forced back out of its operating position due to the downward movement of the associated rigid arm 147, so that with the downward movement of a harness the blocking of the subsequent or next following harness of the row is released. As regards the first harness carrier 144 of a row and appearing at the left side of the drawing, the blocking action exerted thereon is annihilated or removed with the aid of a control cam 149. The actuation of this control cam 149 always occurs in the illustrated position of the associated eccentric 141, that is in its uppermost stroke during which the flexed head 144' of the relevant harness carrier 144, as readily seen from this figure, is raised from the corresponding locking pawl 146. The arrangement with the remaining harness carriers, which in analogous manner to the terminology previously employed can be conveniently designated as drive or operating cells, is identical. Finally, there is still to be noted the spiral-like transposition of the eccentrics 141 with respect to one another, whereby, as will be noted, a wave-like or wave-shaped harness movement and shed formation is obtained.

If, now, during rotation of the shaft 140, in the illustrated starting position depicted in the drawing, the blocking of the first harness carrier 144 is released with the help of the control cam 149, that is, an indexing command is given, then the first harness carrier 144 first of all begins to carry out its indexing step, whereby the blocking of the next following harness carrier is released with a time-delay, and just at the moment that this harness carrier is raised by the associated eccentric from the locking pawl 146. Thus, the imparted indexing command wanders or travels through the entire row and there results a wave-shaped harness movement. It is to be understood that the shaft 140 can rotate without the row of harnesses undergoing an indexing step. In other words, the harnesses can remain in their rest position during one or more machine cycles or cadences. Everything else that has been said in conjunction with the initially considered embodiments holds true without limitation for this embodiment. With reference to a practical embodiment of this type which is differently constructed there should now have been confirmed and proven, above all, that the invention in no way is to be limited to one of the exemplary embodiments.

The introduction of the indexing step sequence to the drive arrangement of FIGURE 44 can, for example, be undertaken with the help of a reading-in or keying-in mechanism of the type shown in FIGURE 45. In this figure there is depicted the first outwardly arranged harness carrier 144 of a harness carrier row appearing at the left-side of FIGURE 44. This harness carrier 144 is suspended upon slider means 143' which is somewhat modified with respect to the corresponding slider means 143 of FIGURE 44. The slider means 143' differs from the aforedescribed slider means 143 insofar as it possesses an upwardly inclined, flexed or bent arm 150. The remaining portions of the arrangement insofar as such correspond to that of FIGURE 44 have been designated with like reference numerals.

In lieu of the control cam 149 of the previous embodiment of FIGURE 44, in this embodiment there is provided the keying-in mechanism or device, designated in its entirety by reference character 151. This keying-in mechanism 151 exhibits a slider means 153 provided with an operating knob or member 152. Slider means 153 is displaceably guided vertically against the action of a spring 158 upon stationary pins or studs 154 and 155 engaging with elongated slots 156 and 157, respectively, of the aforesaid slider means 153. Upon depressing the slider means 153 by means of the operating knob 152 out of the depicted rest position the inclined surface 159 of such slider means 153 comes to bear against the upper end of the vertical arm 146' of the locking pawl 146, whereby this locking pawl is pivoted out of its locking or blocking position. At the same time the flexed end 161' of a double-arm locking lever 161, rockably mounted upon a stationary pin 162, engages under the action of a spring 160 with a recess 163 of the slider means 153, so that such slider means 153 is prevented from returning back into its rest or starting position.

If, now, the slider means 143' is downwardly displaced by means of the eccentric 141 then the harness carrier 144 can perform a step movement. However, at the same time the inclined surface 164 of the flexed arm 150 of the slider means 143' engages with a tapered or inclined projection 165 of the locking lever 161, this projection 165 coming to rest in the locking position of the locking lever 161 in the path of movement of the arm 150. Due to the downward movement of the arm 150 the locking lever 161 is pivoted or rocked back into the illustrated rest position and the released slider means 153 is likewise returned by the spring 158 back into its rest or starting position. In this position the slider means 153 blocks the locking lever 161, whereby the projection 165 is located externally of the path of movement of the arm 150.

As can be readily recognized from the foregoing, the keying-in mechanism 151 is constructed in such a manner that a keyed-in or read-in indexing step remains stored until taking over of the same by the first harness carrier 144; yet with such a taking-over however, that which has been stored within the keying-in mechanism 151 is cancelled or annulled. Upon keying-in an indexing step sequence the drive arrangement is advantageously manually maintained in motion or maintained in motion by an appropriately low speed.

The keying-in device of FIGURE 46 and designated by reference numeral 166 operates in basically the same manner. This keying-in mechanism 166 can, for example, be employed in conjunction with the drive arrangement present in FIGURES 20 to 22 or with modified physical constructions of such drive arrangements. Here again, the same reference numerals employed in FIGURES 20 to 22 have been used for the same elements of FIGURE 46.

Inspecting now FIGURE 46 it will be seen that there is depicted in depressed position slide means 168 provided with an operating knob 167, such slide means being guided by stationary pins 170 engaging with elongated slots thereof. In this depressed position of the slide means 168 a locking pawl 171 engages with a recessed portion 173 of such slide means 168 under the action of a spring 172 engaging with the locking pawl 171 and the slide means 168. Such engagement of the locking pawl 171 with the recess portion 173 prevents return movement of the slide means 168 back into its starting or rest position. The locking pawl 171 is mounted to rock upon a stationary pin 174. The spring 172 at the same time serves, as should be readily apparent, to return the slider means 168 back into its rest position.

In the illustrated position of the slider means 168 an entrainment extension 175 of a control rod 176 engages with a tooth gap of indexing gear 45. The control or guide rod 176 is operably connected with the slider means 168 through the agency of a pin 177 secured to control rod 176, this pin extending into an elongated slot 178 provided at the slider means 168. The control rod 176 is articulated at its other end, at 179, to a double-arm lever 180 which, in turn, is rockably mounted upon a stationary pin or shaft 181. Under the action of a spring 182 engaging with the lever 180 the pin 177 is pressed against the left end of the elongated slot 178 into the position shown in the drawing, whereby a follower roller 183 mounted at the other end of the lever 180 comes to bear against a control cam 184, the latter of which is keyed to the shaft 185 of the drive gear 47. Upon rotation of the drive gear 47 in the direction of the arrow p, that is counterclockwise, the follower roller 183 travels upon the highpoint surface 186 of the control cam 184, whereby the lever 180 is pivoted in clockwise direction and the indexing gear 45 is placed into meshing engagement with correspondingly accelerated movement with the drive gear 47. After a pivotal movement of the lever 180 which is sufficient to relinquish engagement of the indexing gear 45 with the drive gear 47, a stop 187 of the control rod 176 comes to bear against an associated stop of the locking pawl 171, so that by virtue of the further rocking or pivotal movement of the lever 180 the locking pawl 171 is pivoted in counterclockwise direction against the action of the spring 172 out of its locking position and the slider means 168 is released. Due to the thus resultant return movement of the slider means 168 the entrainment means 175 is disengaged from the indexing gear 45. In the rest position of the slider means 168 the pin 177 of the control rod 176 again bears against the left end of the slot 178 shown in the drawing, whereby, as should be ascertainable from the drawing, the lever 180 is pivoted with respect to its illustrated position to such an extent in the clockwise direction that the follower roller 183 is completely out of engagement with the control cam 184.

Also with this embodiment of keying-in or switching-in mechanism the introduced indexing step is initially stored, then taken-over by the indexing gear 45, whereby the storage in the keying-in mechanism is neutralized or annulled and the keying-in mechanism is itself brought back into its rest position. It is still specifically to be mentioned that in addition to the aforedescribed and aforementioned mechanical embodiment, quite obviously other embodiments are possible, for example hydromechanical, electromechanical, hydraulic and so forth. Thus, for example, an indexing step can be readily represented by a definite quantity of a fluid which is then transmitted from operating cell to operating cell, or as the case may be is delivered to the cells. Also, as should be apparent, the different embodiments or features thereof may be readily combined to provide different structural arrangements as will become readily apparent to these versed in the art.

While there is shown and described present preferred embodiments of the invention it is to be distinctly understood that the invention is not limited thereto but may be otherwise variously embodied and practised within the scope of the following claims.

What is claimed is:

1. Drive arrangement with stepwise power take-off comprising a plurality of stepwise indexing members, drive means with which said plurality of stepwise indexing members are capable of being brought into operable engagement, starter means for connecting in series said plurality of stepwise indexing members and incorporating a respective starter mechanism situated between each two neighboring indexing members, each said starter mechanism responding to indexing movements of one neighboring stepwise indexing member and operable with a time delay upon the other neighboring stepwise indexing member, whereby power can be taken-off at least one of said stepwise indexing members.

2. Drive arrangement according to claim 1 wherein said drive means provides a common drive for said stepwise indexing members.

3. Drive arrangement according to claim 1 wherein said drive means comprise synchronized drives.

4. Drive arrangement according to claim 1 wherein said stepwise indexing members are arranged in a closed row.

5. Drive arrangement according to claim 4 including a further plurality of stepwise indexing members arranged in an open row, at least one stepwise indexing member of said closed row providing the first element of said open row of stepwise indexing members.

6. Drive arrangement according to claim 4 including a further plurality of stepwise indexing members arranged in an open row, drive means for said stepwise indexing members of said open row, at least one stepwise indexing member of said closed row coupled with said drive means of said open row.

7. Drive arrangement according to claim 4 including a further plurality of stepwise indexing members arranged in a further closed row, drive means for said further plurality of stepwise indexing members, at least one stepwise indexing member of said closed row coupled with said drive means of said further plurality of stepwise indexing members arranged in said further closed row.

8. Drive arrangement according to claim 1, said drive means comprising drive gear means, each of said stepwise indexing members comprising an indexing gear provided with a portion devoid of gear teeth to provide a recess, said indexing gears being engageable with said drive gear means.

9. Drive arrangement according to claim 8 wherein each starter mechanism is constructed to provide a drag-type coupling, said drag-type coupling incorporating a dragged coupling portion and a dragging coupling portion, each indexing gear having operably connected for rotation therewith the dragged coupling portion of a previously arranged starter mechanism and the dragging coupling portion of a subsequent arranged starter mechanism.

10. Drive arrangement according to claim 9 wherein at least one coupling portion of each drag-type coupling is constructed as lock means for the other coupling portion of said drag-type coupling during non-positive coupling action.

11. Drive arrangement according to claim 10 wherein each of said drag-type couplings are constructed so as to be reversible in their coupling action.

12. Drive arrangement according to claim 9 wherein each drag-type coupling is constructed such that the dragged coupling portion is gradually accelerated during the starting phase of an indexing movement and the dragging coupling portion is gradually braked in the end phase of said indexing movement.

13. Drive arrangement according to claim 10 wherein each drag-type coupling is constructed such that the dragged coupling portion is gradually accelerated during the starting phase of an indexing movement and the dragging coupling portion is gradually braked in the end phase of said indexing movement.

14. Drive arrangement according to claim 11 wherein each drag-type coupling is constructed such that the dragged coupling portion is gradually accelerated during the starting phase of an indexing movement and the dragging coupling portion is gradually braked in the end phase of said indexing movement.

15. Drive arrangement according to claim 8 including a power take-off gear meshing with a portion of an indexing gear provided with teeth and from which indexing gear power is removed.

16. Drive arrangement according to claim 15 including a shaft provided for said drive gear means, said power take-off gear being loosely mounted upon said shaft.

17. Drive arrangement according to claim 9 including a pair of gears for operably coupling each indexing gear with said dragging coupling portion of said subsequent arranged starter mechanism.

18. Drive arrangement according to claim 17 including a first shaft upon which are loosely mounted said indexing gears with their associated dragged coupling portion and one gear of said pair of gears, and a second shaft upon which is loosely mounted the dragging portion of each starter mechanism together with the other gear of said pair of gears.

19. Drive arrangement according to claim 18 including a common drive shaft, said first and second shafts being concentrically arranged about said common drive shaft.

20. Drive arrangement according to claim 1 including optionally activatable keying-in means operable upon a first stepwise indexing member of said plurality of stepwise indexing members.

21. Drive arrangement according to claim 20 wherein said keying-in means includes means for operably coupling said first stepwise indexing member with said drive means.

22. Drive arrangement according to claim 21, said operably coupling means including a coupling element, resilient means cooperating with said coupling element, lock means for retaining said coupling element in a locked position against the action of said resilient means, said coupling element in said locked position effecting coupling of said first stepwise indexing member with said drive means, release means responsive to the indexing movement of said first stepwise indexing member for rendering ineffective said lock means.

23. In combination with a loom, a drive arrangement with stepwise power take-off comprising a plurality of stepwise indexing members, drive means with which said plurality of stepwise indexing members are capable of being brought into operable engagement, starter means for connecting in series said plurality of stepwise indexing members and incorporating a starter mechanism situated between each two neighboring indexing members, each said starter mechanism responding to indexing movements of one neighboring stepwise indexing member and operable with a time delay upon the other neighboring stepwise indexing member, whereby power can be taken-off at least one of said stepwise indexing members.

24. The combination according to claim 23 wherein said loom is provided with warp thread control means, said warp thread control means being operably coupled with at least one stepwise indexing member.

25. The combination according to claim 24 wherein said warp thread control means includes at least one harness and a harness drive for said harness, said plurality of stepwise indexing members being arranged in a closed row, at least one stepwise indexing member of said closed row being operably connected with said harness drive for said harness.

26. The combination according to claim 25 wherein said plurality of stepwise indexing members are arranged in a plurality of closed rows, said drive means providing a common drive for said plurality of closed rows.

27. The combination according to claim 25 wherein said warp thread control means includes a plurality of harnesses and a harness drive for each harness, said plurality of stepwise indexing members being arranged in a closed row, each second stepwise indexing member of said closed row being operably coupled with the harness drive of a respective associated harness.

28. The combination according to claim 25 wherein said warp thread control means includes a plurality of harnesses and a harness drive for each harness, said plurality of stepwise indexing members being connected in series and providing a closed row, at least a number of said series connected stepwise indexing members of said closed row each being operably coupled with a harness drive of an associated harness.

29. The combination according to claim 24 wherein said warp thread control means includes a plurality of harnesses and a harness drive for each harness, said stepwise indexing members being arranged in a closed row, a further plurality of stepwise indexing members arranged in an open row, at least one stepwise indexing member of said closed row providing the first element of said open row of stepwise indexing members, said stepwise indexing members of said open row each being operably coupled with the harness drive of an associated harness.

30. The combination according to claim 29 including a plurality of closed rows of stepwise indexing members, said drive means providing a common drive for said plurality of closed rows.

31. The combination according to claim 29 wherein each second stepwise indexing member of said closed row provides the first element of an open row, and wherein each stepwise indexing member of said open row is operably coupled with the harness drive of an associated harness.

32. The combination according to claim 24 wherein said warp thread control means includes a plurality of harnesses and a harness drive for each harness, said starter means including a respective arm extending from one harness and operable with time delay upon the next subsequent harness.

33. The combination according to claim 32 including a respective locking pawl actuated by said arm and cooperating with each harness.

34. The combination according to claim 23 wherein said loom is provided with weft thread control means, at least one stepwise indexing member being operably connected with said weft thread control means.

35. The combination according to claim 34 wherein said weft thread control means includes at least one summation drive mechanism.

36. The combination according to claim 35 wherein said weft thread control means includes a rack adapted to be selectively displaced by said summation drive mechanism.

37. The combination according to claim 34 wherein said weft thread control means incorporates a pair of eccentrics operably connected with said drive arrangement, and a selector element cooperating with said pair of eccentrics.

No references cited.

DONALD W. PARKER, *Primary Examiner.*